(12) United States Patent
Dai

(10) Patent No.: US 9,779,682 B2
(45) Date of Patent: Oct. 3, 2017

(54) GOA CIRCUIT WITH FORWARD-BACKWARD SCAN FUNCTION

(71) Applicant: Shenzhen China Star Optoelectronics Technology Co., Ltd., Shenzhen (CN)

(72) Inventor: Chao Dai, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 193 days.

(21) Appl. No.: 14/762,804

(22) PCT Filed: May 21, 2015

(86) PCT No.: PCT/CN2015/079484
§ 371 (c)(1),
(2) Date: Jul. 22, 2015

(87) PCT Pub. No.: WO2016/173017
PCT Pub. Date: Nov. 3, 2016

(65) Prior Publication Data
US 2017/0148403 A1  May 25, 2017

(30) Foreign Application Priority Data

Apr. 27, 2015  (CN) .......................... 2015 1 0206122

(51) Int. Cl.
*G09G 3/36* (2006.01)
*G02F 1/1368* (2006.01)

(52) U.S. Cl.
CPC ......... *G09G 3/3677* (2013.01); *G02F 1/1368* (2013.01); *G09G 2300/0408* (2013.01); *G09G 2310/0283* (2013.01); *G09G 2310/08* (2013.01)

(58) Field of Classification Search
CPC .. G09G 3/3266; G09G 3/3674–3/3681; G09G 2310/02–2310/0216; G09G 2310/0267; G09G 2310/0278–2310/0294
See application file for complete search history.

(56) References Cited

U.S. PATENT DOCUMENTS

2009/0189679 A1* 7/2009 Lee ...................... G09G 3/3677
327/436
2013/0076703 A1* 3/2013 Baek .................... G09G 3/2092
345/204

(Continued)

*Primary Examiner* — Sanghyuk Park
(74) *Attorney, Agent, or Firm* — Leong C. Lei

(57) ABSTRACT

The present invention provides a GOA circuit with forward-backward scan function. In the GOA unit circuit of every stage, the pull-up controlling module comprises two thin film transistors respectively controlling the forward, backward scans. With proper received signals, as the thin film transistor controlling the forward scan is on, the GOA circuit performs forward scan from the GOA unit circuit of the first stage to the GOA unit circuit of the last stage, and as the thin film transistor controlling the backward scan is on, the GOA circuit performs backward scan from the GOA unit circuit of the last stage to the GOA unit circuit of the first stage. Thurs, the GOA circuit possessing functions of forward scan and backward scan at the same time can be achieved to expand the application field of the GOA circuit.

12 Claims, 20 Drawing Sheets

(56) References Cited

U.S. PATENT DOCUMENTS

2014/0210700 A1* 7/2014 Won ..................... G09G 3/3677
                                                                  345/102
2015/0015556 A1* 1/2015 Pappas ................ H01L 27/1225
                                                                  345/211

* cited by examiner

GOA CIRCUIT WITH FORWARD-BACKWARD SCAN FUNCTION

FIELD OF THE INVENTION

The present invention relates to a liquid crystal display driving field, and more particularly to a GOA circuit with forward-backward scan function.

BACKGROUND OF THE INVENTION

The Liquid Crystal Display (LCD) possesses advantages of thin body, power saving and no radiation to be widely used in many application scope, such as LCD TV, mobile phone, personal digital assistant (PDA), digital camera, notebook, laptop, and dominates the flat panel display field.

Most of the liquid crystal displays on the present market are backlight type liquid crystal displays, which comprise a liquid crystal display panel and a backlight module. The working principle of the liquid crystal display panel is that the Liquid Crystal is injected between the Thin Film Transistor Array Substrate (TFT array substrate) and the Color Filter (CF). The light of backlight module is refracted to generate images by applying driving voltages to the two substrates for controlling the rotations of the liquid crystal molecules.

In the active liquid crystal display, each pixel is electrically coupled to a thin film transistor (TFT), and the gate of the thin film transistor is coupled to a level scan line, and the drain is coupled to a vertical data line, and the source is coupled to the pixel electrode. The enough voltage is applied to the level scan line, and all the TFTs electrically coupled to the horizontal scan line are activated. Thus, the signal voltage on the data line can be written into the pixel to control the transmittances of different liquid crystals to achieve the effect of controlling colors and brightness. The driving of the level scan line in the present active liquid crystal display is mainly accomplished by the external Integrated Circuit (IC). The external IC can control the charge and discharge stage by stage of the level scan lines of respective stages. The GOA (Gate Driver on Array) technology, i.e. the array substrate row driving technology can utilize the array manufacture process of the liquid crystal display panel to manufacture the gate driving circuit on the TFT array substrate for realizing the driving way of scanning the gates row by row. The GOA technology can reduce the bonding procedure of the external IC and has potential to raise the productivity and lower the production cost. Meanwhile, it can make the liquid crystal display panel more suitable to the narrow frame or non frame design of display products.

The GOA circuit according to prior art generally utilizes single way scan, which only can select one of the forward scan and the backward scan. The demands of product diversification cannot be satisfied. Therefore, some GOA circuits with forward-backward scan function are required to be designed.

SUMMARY OF THE INVENTION

An objective of the present invention is to provide a GOA circuit with forward-backward scan function capable of realizing the forward-backward scan of the GOA circuit to expand the application field of the GOA circuit.

For realizing the aforesaid objective, the present invention provides a GOA circuit with forward-backward scan function, comprising a plurality of GOA unit circuits which are cascade connected, and the GOA unit circuit of every stage comprises a pull-up controlling module, a pull-up module, a transmission module, a first pull-down module, a bootstrap capacitor and a pull-down holding module;

N is set to be a positive integer and except the GOA unit circuit of the first and last stages, in the GOA unit circuit of the Nth stage:

the pull-up controlling module is employed to control the GOA circuit to perform forward scan or backward scan, and is electrically coupled to a first node and the pull-down holding module; the pull-up controlling module at least comprises a thin film transistor for controlling the forward scan and a film transistor for controlling the backward scan, and a stage transfer at least coupled to a GOA unit circuit of the former N−1th stage, a stage transfer at least coupled to a GOA unit circuit of the latter N+1th stage and a positive constant voltage source;

the pull-up module comprises: a twenty-first thin film transistor, and a gate of the twenty-first thin film transistor is electrically coupled to the first node, and a source is electrically coupled to a Mth clock signal, and a drain is electrically coupled to a scan driving signal;

the transmission module comprises: a twenty-second thin film transistor, and a gate of the twenty-second thin film transistor is electrically coupled to the first node, and a source is electrically coupled to the Mth clock signal, and a drain is electrically coupled to the stage transfer signal;

the first pull-down module is electrically coupled to the first node and a scan drive signal, and at least comprises one thin film transistor controlled by a M+2 clock signal;

the bootstrap capacitor module comprises a capacitor, and one end of the capacitor is electrically coupled to the first node, and the other end is electrically coupled to the scan drive signal;

the pull-down holding module at least comprises: an inverter constructed by a plurality of thin film transistors, and an input end of the inverter is electrically coupled to the first node, and an output end is electrically coupled to a second node; a forty-second thin film transistor, and a gate of the forty-second thin film transistor is electrically coupled to the second node, and a source is electrically coupled to the first node, and a drain is electrically coupled to a second negative constant voltage source; a thirty-second thin film transistor, and a gate of the thirty-second thin film transistor is electrically coupled to the second node, and a source is electrically coupled to the scan drive signal, and a drain is electrically coupled to a first negative constant voltage source;

the clock signal comprise four clock signals: a first clock signal, a second clock signal, a third clock signal and a fourth clock signal; as the clock signal is the third clock signal, the M+2th clock signal is the first clock signal, and as the clock signal is the fourth clock signal, the M+2th clock signal is the second clock signal; a duty ratio of the clock signal is 25/75;

a voltage level of the second negative constant voltage source is smaller than a voltage level of the first negative constant voltage source.

The pull-up controlling module comprises two thin film transistors: an eleventh thin film transistor and a twelfth thin film transistor;

a gate of the eleventh thin film transistor receives the stage transfer signal of the GOA unit circuit of the former N−1th stage, and a source receives the positive constant voltage source, and a drain is electrically coupled to the first node; a gate of the twelfth thin film transistor receives a stage transfer signal of the GOA unit circuit of the latter N+1th stage, and a source receives the positive constant voltage source, and a drain is electrically coupled to the first node; the eleventh thin film transistor is employed to control the forward scan, and the twelfth thin film transistor is employed to control the backward scan.

In the first stage connection of the GOA circuit with forward-backward scan function, the gate of the eleventh thin film transistor receives a scan activation signal, and the gate of the twelfth thin film transistor receives the stage transfer signal of the GOA unit circuit of the second stage, and the source of the twenty-first thin film transistor and the source of the twenty-second thin film transistor are electrically coupled to the first clock signal;

in the last stage connection of the GOA circuit with forward-backward scan function, the gate of the eleventh thin film transistor receives the stage transfer signal of the GOA unit circuit of the next stage to the last stage, and the gate of the twelfth thin film transistor receives the scan activation signal, and the source of the twenty-first thin film transistor and the source of the twenty-second thin film transistor are electrically coupled to the fourth clock signal.

The pull-up controlling module comprises an eleventh thin film transistor, a twelfth thin film transistor and a thirteenth thin film transistor;

a gate of the eleventh thin film transistor receives a forward scan control voltage, and a source receives the stage transfer signal of the GOA unit circuit of the former N−1th stage, and a drain is electrically coupled to a gate of the thirteenth thin film transistor; a gate of the twelfth thin film transistor receives a backward scan control voltage, and a source receives a stage transfer signal of the GOA unit circuit of the latter N+1th stage, and a drain is electrically coupled to a gate of the thirteenth thin film transistor; the gate of the thirteenth thin film transistor is electrically coupled to the drain of the eleventh thin film transistor and the drain of the twelfth thin film transistor, and a source receives the positive constant voltage source, and a drain is electrically coupled to the first node; the eleventh thin film transistor is combined with the forward scan control voltage to control the forward scan, and the twelfth thin film transistor is combined with the backward scan control voltage to control the backward scan;

in forward scan, the forward scan voltage level signal is positive high voltage level, and the backward scan voltage level signal is negative low voltage level;

in backward scan, the forward scan voltage level signal is negative low voltage level, and the backward scan voltage level signal is positive high voltage level.

In the first stage connection of the GOA circuit with forward-backward scan function, the source of the eleventh thin film transistor receives a scan activation signal, and the source of the twelfth thin film transistor receives the stage transfer signal of the GOA unit circuit of the second stage, and the source of the twenty-first thin film transistor and the source of the twenty-second thin film transistor are electrically coupled to the first clock signal;

in the last stage connection of the GOA circuit with forward-backward scan function, the source of the eleventh thin film transistor receives the stage transfer signal of the GOA unit circuit of the next stage to the last stage, and the source of the twelfth thin film transistor receives the scan activation signal, and the source of the twenty-first thin film transistor and the source of the twenty-second thin film transistor are electrically coupled to the fourth clock signal.

The first pull-down module comprises a thin film transistor: a forty-first thin film transistor, and a gate of the forty-first thin film transistor is electrically coupled to a M+2th clock signal, and a source is electrically coupled to the first node, and a drain is electrically coupled to the scan drive signal.

The first pull-down module comprises two thin film transistors and a fortieth thin film transistor;

a gate of the forty-first thin film transistor is electrically coupled to a M+2th clock signal, and a source is electrically coupled to a drain of the fortieth thin film transistor, and a drain is electrically coupled to the scan drive signal; both a gate and a source of the fortieth thin film transistor are electrically coupled to the first node, and a drain is electrically coupled to the source of the fortieth thin film transistor.

The first pull-down module comprises two thin film transistors: a forty-first thin film transistor and a fortieth thin film transistor;

a gate of the fortieth thin film transistor is electrically coupled to a M+2th clock signal, and a source is electrically coupled to the first node, and a drain is electrically coupled to a gate and a source of the forty-first thin film transistor; both the gate and the source of the forty-first thin film transistor are electrically coupled to the drain of the fortieth thin film transistor, and a drain is electrically coupled to the scan drive signal.

The pull-down holding module further comprises: a twenty-third thin film transistor, and a gate of the twenty-third thin film transistor is electrically coupled to the second node, and a source is electrically coupled to a second negative constant voltage source, and a drain is electrically coupled to the stage transfer signal.

The pull-down holding module comprises an inverter, a thirty-second thin film transistor, a forty-second thin film transistor, a seventy-fourth thin film transistor and a seventy-third thin film transistor; a source of the forty-second thin film transistor is electrically coupled to a second negative constant voltage source via the seventy-fourth thin film transistor;

a gate of the seventy-fourth thin film transistor is electrically coupled to the second node, and a source is coupled to a second negative constant voltage source, and a drain is electrically coupled to the source of the forty-second thin film transistor and a source of the seventy-third thin film transistor; a gate of the seventy-third thin film transistor is electrically coupled to the first node, and a source is electrically coupled to a drain of the seventy-fourth thin film transistor, and a drain is electrically coupled to the positive constant voltage source;

the inverter is a dual inverter, comprising: a fifty-first thin film transistor, and both a gate and a source of the fifty-first thin film transistor are electrically coupled to the positive constant voltage source, and a drain is electrically coupled to a third node; a fifty-second thin film transistor, and a gate of the fifty-second thin film transistor is electrically coupled to the first node, and a source is electrically coupled to the third node, and a drain is electrically coupled to a first negative constant voltage source or the second negative constant voltage source; a fifty-third thin film transistor, and a gate of the fifty-third thin film transistor is electrically coupled to the third node, and a source is electrically coupled to the positive constant voltage source, and a drain is electrically coupled to the second node; a fifty-fourth thin film transistor, and a gate of the fifty-fourth thin film transistor is electrically coupled to the first node, and a source is electrically coupled to the second node, and a drain is electrically coupled to a fourth node; a sixty-third thin film transistor, and a gate of the sixty-third thin film transistor is electrically coupled to the third node, and a source is electrically coupled to the positive constant voltage source, and a drain is electrically coupled to the fourth node; a sixty-fourth thin film transistor, and a gate of the sixty-fourth thin film transistor is electrically coupled to the first node, and a source is electrically coupled to the fourth node, and a drain is electrically coupled to the second negative constant voltage source; wherein the fifty-first thin film transistor, the fifty-second thin film transistor, the fifty-third thin film transistor and the fifty-fourth thin film transistor construct a main inverter, and the sixty-third thin film transistor and the sixty-fourth thin film transistor construct an auxiliary inverter.

The present invention further provides a GOA circuit with forward-backward scan function, comprising a plurality of GOA unit circuits which are cascade connected, and the GOA unit circuit of every stage comprises a pull-up controlling module, a pull-up module, a transmission module, a first pull-down module, a bootstrap capacitor module and a pull-down holding module;

N is set to be a positive integer and except the GOA unit circuit of the first and last stages, in the GOA unit circuit of the Nth stage:

the pull-up controlling module is employed to control the GOA circuit to perform forward scan or backward scan, and is electrically coupled to a first node and the pull-down holding module; the pull-up controlling module at least comprises a thin film transistor for controlling the forward scan and a film transistor for controlling the backward scan, and a stage transfer at least coupled to a GOA unit circuit of the former N−1th stage, a stage transfer at least coupled to a GOA unit circuit of the latter N+1th stage and a positive constant voltage source;

the pull-up module comprises: a twenty-first thin film transistor, and a gate of the twenty-first thin film transistor is electrically coupled to the first node, and a source is electrically coupled to a Mth clock signal, and a drain is electrically coupled to a scan driving signal;

the transmission module comprises: a twenty-second thin film transistor, and a gate of the twenty-second thin film transistor is electrically coupled to the first node, and a source is electrically coupled to the Mth clock signal, and a drain is electrically coupled to the stage transfer signal;

the first pull-down module is electrically coupled to the first node and a scan drive signal, and at least comprises one thin film transistor controlled by a M+2 clock signal;

the bootstrap capacitor module comprises a capacitor, and one end of the capacitor is electrically coupled to the first node, and the other end is electrically coupled to the scan drive signal;

the pull-down holding module at least comprises: an inverter constructed by a plurality of thin film transistors, and an input end of the inverter is electrically coupled to the first node, and an output end is electrically coupled to a second node; a forty-second thin film transistor, and a gate of the forty-second thin film transistor is electrically coupled to the second node, and a source is electrically coupled to the first node, and a drain is electrically coupled to a second negative constant voltage source; a thirty-second thin film transistor, and a gate of the thirty-second thin film transistor is electrically coupled to the second node, and a source is electrically coupled to the scan drive signal, and a drain is electrically coupled to a first negative constant voltage source;

the clock signal comprise four clock signals: a first clock signal, a second clock signal, a third clock signal and a fourth clock signal; as the clock signal is the third clock signal, the M+2th clock signal is the first clock signal, and as the clock signal is the fourth clock signal, the M+2th clock signal is the second clock signal; a duty ratio of the clock signal is 25/75;

a voltage level of the second negative constant voltage source is smaller than a voltage level of the first negative constant voltage source;

wherein the pull-up controlling module comprises two thin film transistors: an eleventh thin film transistor and a twelfth thin film transistor;

a gate of the eleventh thin film transistor receives the stage transfer signal of the GOA unit circuit of the former N−1th stage, and a source receives the positive constant voltage source, and a drain is electrically coupled to the first node; a gate of the twelfth thin film transistor receives a stage transfer signal of the GOA unit circuit of the latter N+1th stage, and a source receives the positive constant voltage source, and a drain is electrically coupled to the first node; the eleventh thin film transistor is employed to control the forward scan, and the twelfth thin film transistor is employed to control the backward scan;

wherein the first pull-down module comprises two thin film transistors: a forty-first thin film transistor and a fortieth thin film transistor;

a gate of the fortieth thin film transistor is electrically coupled to a M+2th clock signal, and a source is electrically coupled to the first node, and a drain is electrically coupled to a gate and a source of the forty-first thin film transistor; both the gate and the source of the forty-first thin film transistor are electrically coupled to the drain of the fortieth thin film transistor, and a drain is electrically coupled to the scan drive signal;

wherein the pull-down holding module further comprises: a twenty-third thin film transistor, and a gate of the twenty-third thin film transistor is electrically coupled to the second node, and a source is electrically coupled to a second negative constant voltage source, and a drain is electrically coupled to the stage transfer signal.

The benefits of the present invention are: the present invention provides a GOA circuit with forward-backward scan function. In the GOA unit circuit of every stage, the pull-up controlling module comprises two thin film transistors respectively controlling the forward, backward scans. With proper received signals, as the thin film transistor controlling the forward scan is on, the GOA circuit performs forward scan from the GOA unit circuit of the first stage to the GOA unit circuit of the last stage, and as the thin film transistor controlling the backward scan is on, the GOA circuit performs backward scan from the GOA unit circuit of the last stage to the GOA unit circuit of the first stage. Thurs, the GOA circuit possessing functions of forward scan and backward scan at the same time can be achieved to expand the application field of the GOA circuit.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
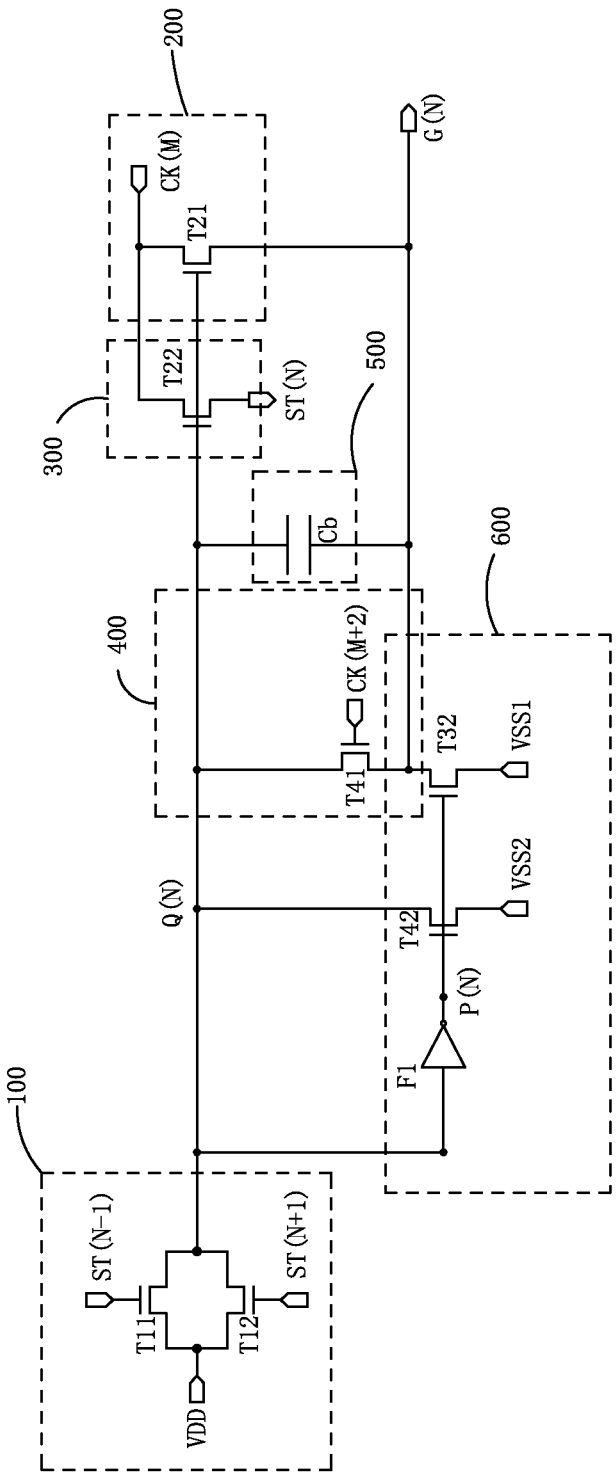
FIG. 1 is a circuit diagram of the first embodiment of a GOA circuit with forward-backward scan function according to the present invention.

The present invention provides a GOA circuit with forward-backward scan function. FIG. 1 is a circuit diagram of the first embodiment of a GOA circuit with forward-backward scan function according to the present invention, comprising a plurality of GOA unit circuits which are cascade connected, and the GOA unit circuit of every stage comprises a pull-up controlling module 100, a pull-up module 200, a transmission module 300, a first pull-down module 400, a bootstrap capacitor module 500 and a pull-down holding module 600.

N is set to be a positive integer and except the GOA unit circuit of the first and last stages, in the GOA unit circuit of the Nth stage:

the pull-up controlling module 100 is employed to control the GOA circuit to perform forward scan or backward scan, and comprises an eleventh thin film transistor T11, and a gate of the eleventh thin film transistor T11 receives the stage transfer signal ST(N−1) of the GOA unit circuit of the former N−1th stage, and a source receives the positive constant voltage source VDD, and a drain is electrically coupled to the first node Q(N); a twelfth thin film transistor T12, and a gate of the twelfth thin film transistor T12 receives a stage transfer signal ST(N+1) of the GOA unit circuit of the latter N+1th stage, and a source receives the positive constant voltage source VDD, and a drain is electrically coupled to the first node Q(N). The eleventh thin film transistor T11 is employed to control the forward scan, and the twelfth thin film transistor T12 is employed to control the backward scan.

The pull-up module 200 comprises: a twenty-first thin film transistor T21, and a gate of the twenty-first thin film transistor T21 is electrically coupled to the first node Q(N), and a source is electrically coupled to a Mth clock signal CK(M), and a drain is electrically coupled to a scan driving signal G(N).

The pull-down module 300 comprises: a twenty-second thin film transistor T22, and a gate of the twenty-second thin film transistor T22 is electrically coupled to the first node Q(N), and a source is electrically coupled to the Mth clock signal CK(M), and a drain is electrically coupled to the stage transfer signal ST(N).

The first pull-down module 400 comprises: a forty-first thin film transistor T41, and a gate of the forty-first thin film transistor T41 is electrically coupled to a M+2th clock signal CK(M+2), and a source is electrically coupled to the first node Q(N), and a drain is electrically coupled to the scan drive signal G(N). With the forty-first thin film transistor T41, the voltage level of the first node Q(N) is pulled to the voltage level of the scan drive signal G(N) in the non-functioning period.

The bootstrap capacitor module 500 comprises a capacitor Cb, and one end of the capacitor Cb is electrically coupled to the first node Q(N), and the other end is electrically coupled to the scan drive signal G(N).

The pull-down holding module 600 comprises: an inverter F1 constructed by a plurality of thin film transistors, and an input end of the inverter F1 is electrically coupled to the first node Q(N), and an output end is electrically coupled to a second node P(N); a forty-second thin film transistor T42, and a gate of the forty-second thin film transistor T42 is electrically coupled to the second node P(N), and a source is electrically coupled to the first node Q(N), and a drain is electrically coupled to a second negative constant voltage source VSS2; a thirty-second thin film transistor T32, and a gate of the thirty-second thin film transistor T32 is electrically coupled to the second node P(N), and a source is electrically coupled to the scan drive signal G(N), and a drain is electrically coupled to a first negative constant voltage source VSS1.

Specifically, the respective thin film transistors are N-type polysilicon semiconductor thin film transistors or oxide semiconductor thin film transistors.

The clock signal CK(M) comprise four clock signals: a first clock signal CK(1), a second clock signal CK(2), a third clock signal CK(3) and a fourth clock signal CK(4). As the clock signal CK(M) is the third clock signal CK(3), the M+2th clock signal CK(M+2) is the first clock signal CK(1), and as the clock signal CK(M) is the fourth clock signal CK(4), the M+2th clock signal CK(M+2) is the second clock signal CK(2). A voltage level of the second negative constant voltage source VSS2 is smaller than a voltage level of the first negative constant voltage source VSS1.

Figure 2:
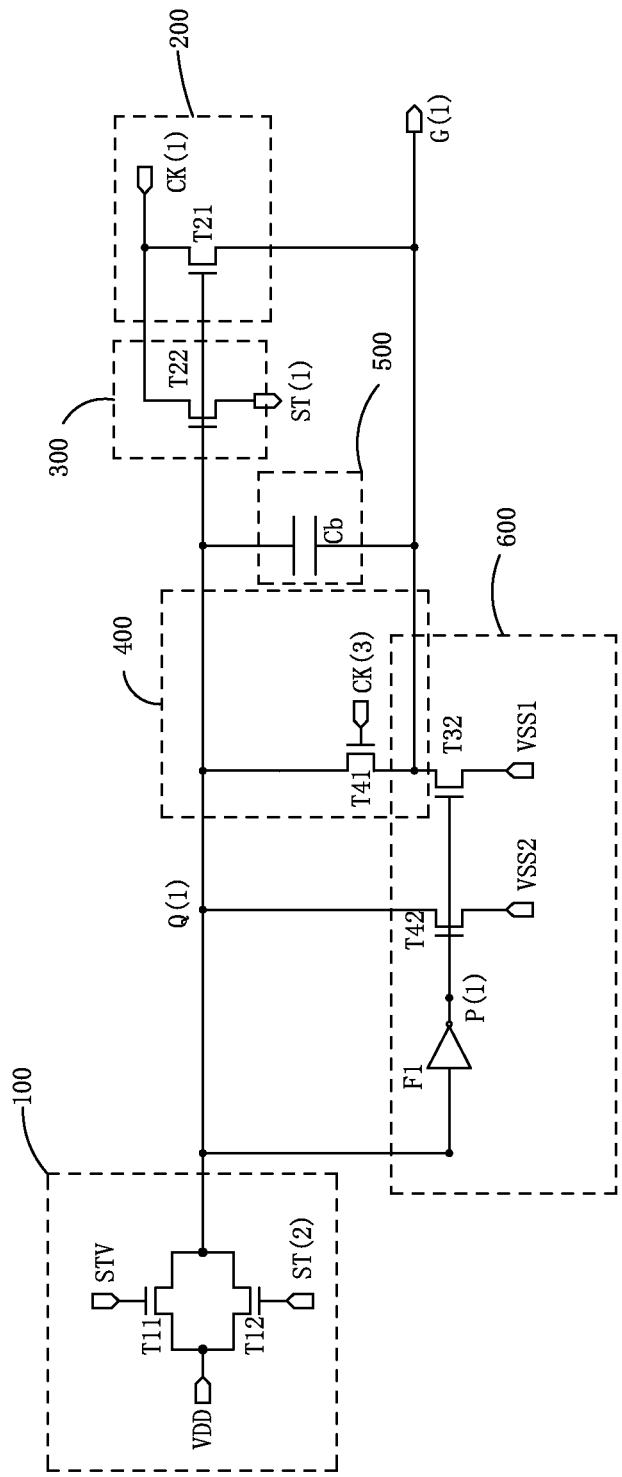
FIG. 2 is a circuit diagram of a GOA unit circuit of the first stage of the first embodiment according to the GOA circuit with forward-backward scan function of the present invention.
Figure 19:
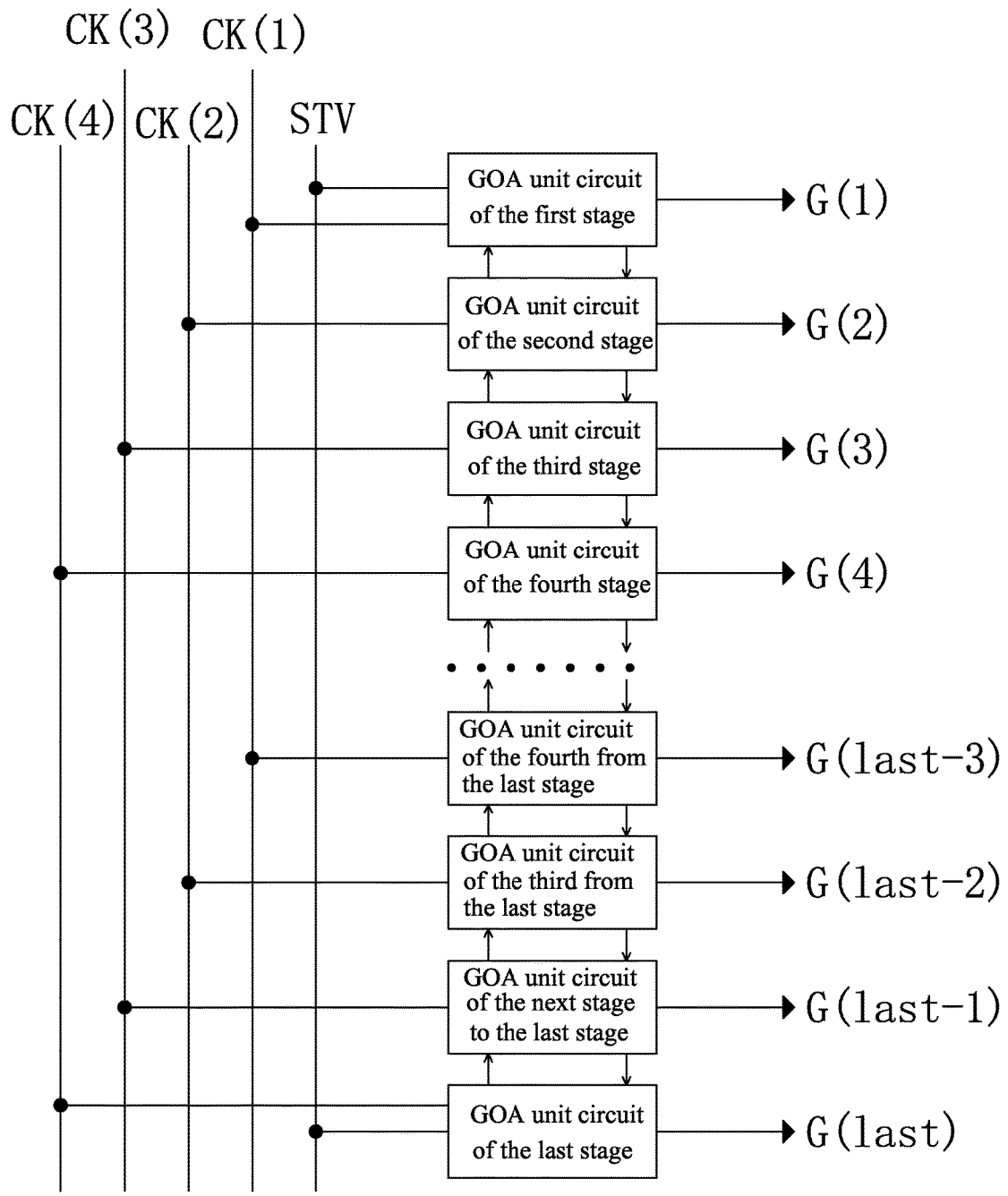
FIG. 19 is a first connection structure diagram of the GOA circuit with forward-backward scan function according to the present invention.

Particularly, referring to FIG. 2 in combination with FIG. 19. In the first embodiment of the present invention, in the first stage of the GOA circuit with forward-backward scan function, the gate of the eleventh thin film transistor T11 receives a scan activation signal STV, and the gate of the twelfth thin film transistor T12 receives the stage transfer signal ST(2) of the GOA unit circuit of the second stage, and the source of the twenty-first thin film transistor T21 and the source of the twenty-second thin film transistor T22 are electrically coupled to the first clock signal CK(1).

Figure 3:
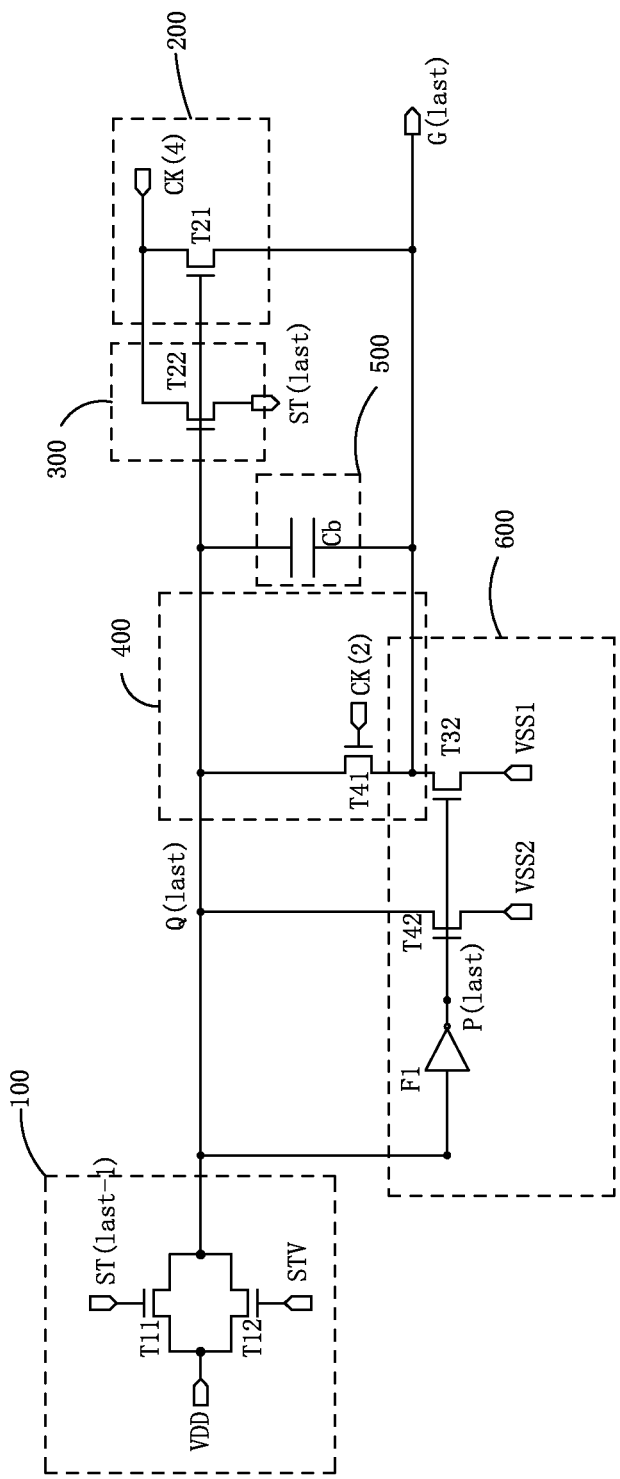
FIG. 3 is a circuit diagram of a GOA unit circuit of the last stage of the first embodiment according to the GOA circuit with forward-backward scan function of the present invention.

Please refer to FIG. 3 in combination with FIG. 19. In the first embodiment of the present invention, in the last stage connection of the GOA circuit with forward-backward scan function, the gate of the eleventh thin film transistor T11 receives the stage transfer signal ST(last−1) of the GOA unit circuit of the next stage to the last stage, and the gate of the twelfth thin film transistor T12 receives the scan activation signal STV, and the source of the twenty-first thin film transistor T21 and the source of the twenty-second thin film transistor T22 are electrically coupled to the fourth clock signal CK(4).

Figure 8:
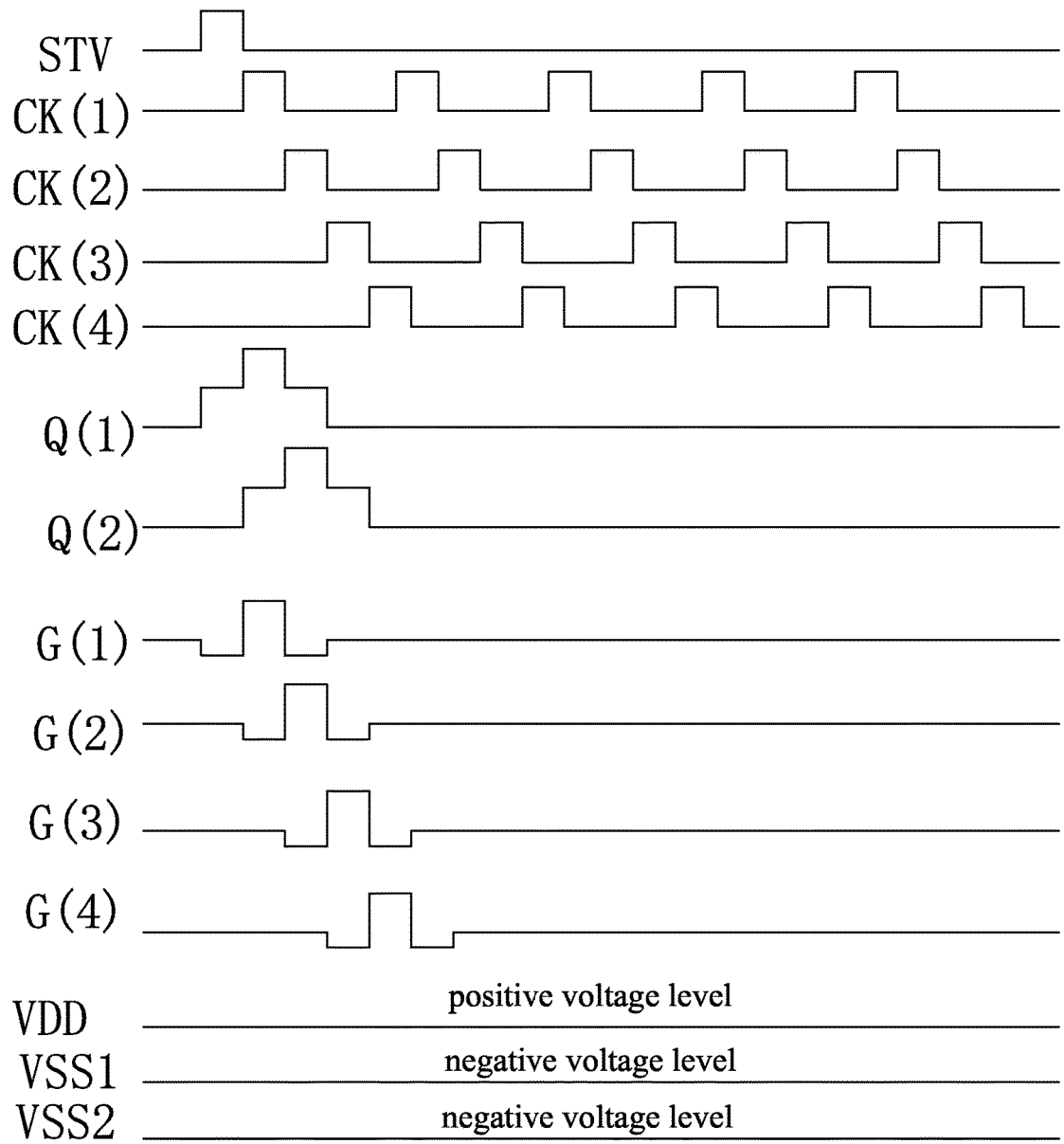
FIG. 8 is a forward scan sequence diagram of the first to fifth embodiments of the GOA circuit with forward-backward scan function according to the present invention.

FIG. 8 is a sequence diagram of the first embodiment of the present invention as forward scan. The STV represents the activation signal of the circuit; CK(1), CK(2), CK(3) and CK(4) are the four clock signals included in the clock signal CK(M), which all are high frequency clock signals, and the duty ratio of every clock signal is 25/75; in forward scan, the clock signal CK(1) is first outputted, and the clock signal CK(4) is outputted last; Q(1), Q(2) respectively are the waveforms of the first node Q(N) in the GOA unit circuits of the first, second stages; G(1), G(2), G(3), G(4) respectively are the waveforms of the scan drive signals G(N) outputted by the GOA unit circuits of the first, second, third, fourth stages; VDD is the positive constant voltage source; VSS1, VSS2 respectively are the first, second negative constant voltage sources.

Combing FIG. 1, FIG. 2, FIG. 8 and FIG. 19, the forward scan working procedure of the first embodiment according to the GOA circuit with forward-backward scan function of the present invention is:

the scan activation signal STV provides a pulse signal to the gate of the eleventh thin film transistor T11 of the GOA unit circuit of the first stage, and the eleventh thin film transistor T11 is on, and the positive voltage of the positive constant voltage source VDD enters the GOA unit circuit of the first stage to charge the capacitor Cb in the bootstrap capacitor module 500 to make the first node Q(N) obtain a positive voltage level. Then, the scan activation signal STV becomes low voltage level, and the first node Q(N) maintains at the positive voltage level with the capacitor Cb, and meanwhile, the twenty-first thin film transistor T21 and the twenty-second thin film transistor T22 are controlled by the first node Q(N) to be on. Then, the first clock signal CK(1) provides high voltage level entering the twenty-first thin film transistor T21 and the twenty-second thin film transistor T22. The drain of the twenty-first thin film transistor T21 outputs the scan drive signal G(1), and the drain of the twenty-second thin film transistor T22 outputs the stage transfer signal ST(1), and both the scan drive signal G(1) and the stage transfer signal ST(1) are high voltage levels. The eleventh thin film transistor T11 of the GOA unit circuit of the second stage is controlled by the stage transfer signal ST(1) to be on, and the positive voltage of the positive constant voltage source VDD enters the GOA unit circuit of the second stage. After the same procedure in the GOA unit circuit of the first stage, the GOA unit circuit of the second stage outputs the scan drive signal G(2) and the stage transfer signal ST(2) of the second stage, and the stage transfer signal ST(2) of the second stage controls the GOA unit circuit of the third stage to realize the scan, and so forth, the stage transfer signal ST(N) is forward transferred in sequence until the GOA unit circuit of the last stage is scanned to achieve the forward scan.

Figure 9:
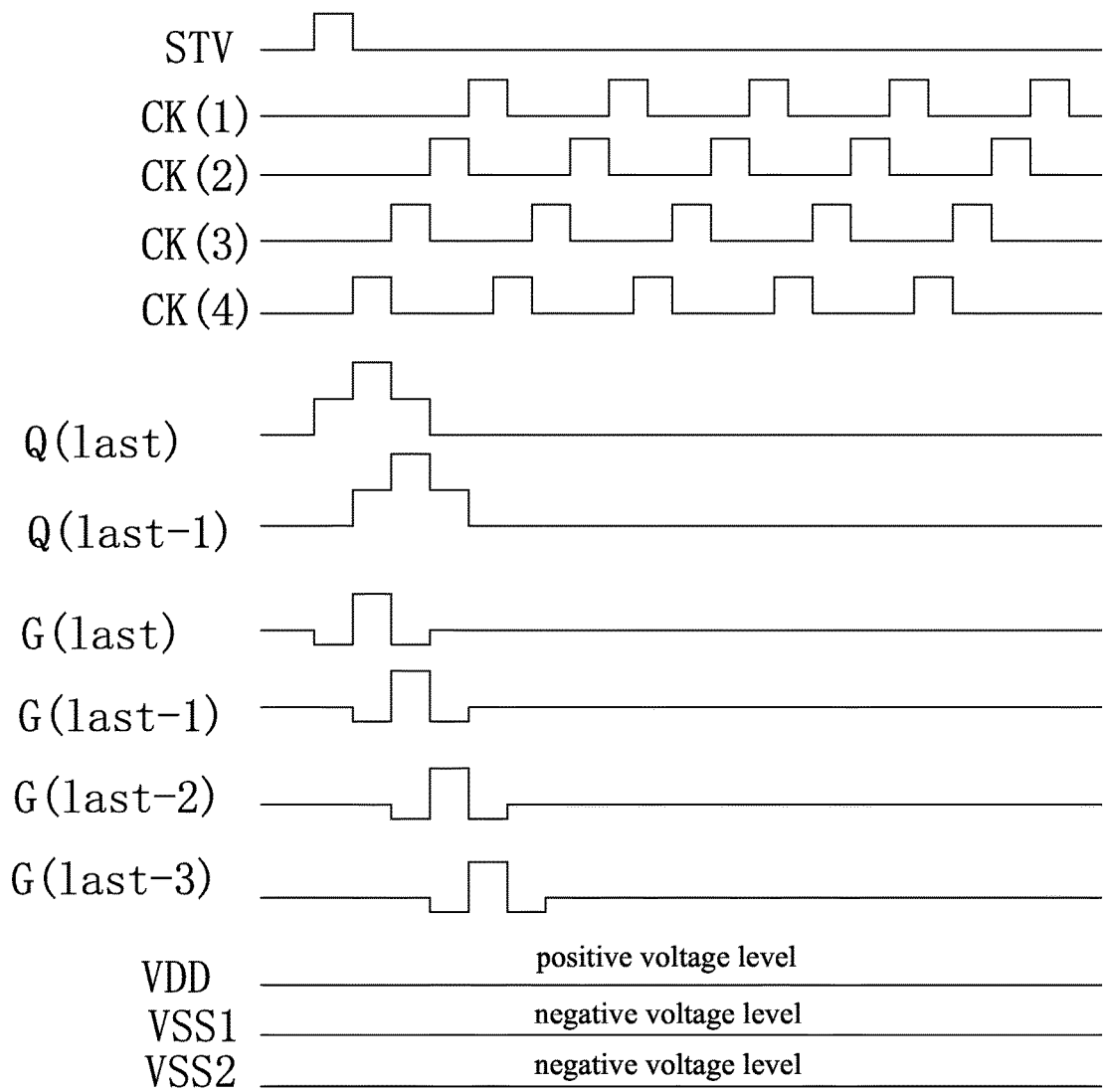
FIG. 9 is a backward scan sequence diagram of the first to fifth embodiments of the GOA circuit with forward-backward scan function according to the present invention.

FIG. 9 is a backward scan sequence diagram of the first embodiment according to the present invention. In contrast of the forward scan, in backward scan, the fourth clock signal CK(4) is outputted first, and the first clock signal CK(1) is outputted last.

Combing FIG. 1, FIG. 3, FIG. 9 and FIG. 19, the backward scan working procedure of the first embodiment according to the GOA circuit with forward-backward scan function of the present invention is: the scan activation signal STV provides a pulse signal to the gate of the twelfth thin film transistor T12 of the GOA unit circuit of the last stage, and the twelfth thin film transistor T12 is on, and the positive voltage of the positive constant voltage source VDD enters the GOA unit circuit of the last stage to charge the capacitor Cb in the bootstrap capacitor module 500 to make the first node Q(N) obtain a positive voltage level. Then, the scan activation signal STV becomes low voltage level, and the first node Q(N) maintains at the positive voltage level with the capacitor Cb, and meanwhile, the twenty-first thin film transistor T21 and the twenty-second thin film transistor T22 are controlled by the first node Q(N) to be on. Then, the fourth clock signal CK(4) provides high voltage level entering the twenty-first thin film transistor T21 and the twenty-second thin film transistor T22. The drain of the twenty-first thin film transistor T21 outputs the scan drive signal G(last), and the drain of the twenty-second thin film transistor T22 outputs the stage transfer signal ST(last), and both the scan drive signal G(last) and the stage transfer signal ST(last) are high voltage levels. The twelfth thin film transistor T12 of the GOA unit circuit of the next stage to the last stage is controlled by the stage transfer signal ST(last) to be on, and the positive voltage of the positive constant voltage source VDD enters the GOA unit circuit of the next stage to the last stage. After the same procedure in the GOA unit circuit of the last stage, the GOA unit circuit of the next stage to the last stage outputs the scan drive signal G(last−1) and the stage transfer signal ST(last−1) of the next stage to the last stage, and the stage transfer signal ST(last−1) of the next stage to the last stage controls the GOA unit circuit of the third to last stage to realize the scan, and so forth, the stage transfer signal ST(N) is backward transferred in sequence until the GOA unit circuit of the first stage is scanned to achieve the backward scan.

Significantly, the time slot of high voltage level of the scan drive signal G(N) is generally so called the functioning period. In the functioning period, the first node Q(N) is high voltage level, and the second node P(N) inverted by the inverter F1 is low voltage level, and both the forty-second thin film transistor T42 and the thirty-second thin film transistor T32 are off to ensure that the first node Q(N) and the scan drive signal G(N) steadily output high voltage levels; in the non-functioning period, as the first node Q(N) outputs low voltage level, and the inverter F1 outputs high voltage level, i.e. the second node P(N) is high voltage level, and both the forty-second thin film transistor T42 and the thirty-second thin film transistor T32 are on. With the forty-second thin film transistor T42 and the thirty-second thin film transistor T32, the first node Q(N) and the scan drive signal G(N) are maintained at low voltage level. The inverter can utilize different designs as long as the invert can function.

Figure 4:
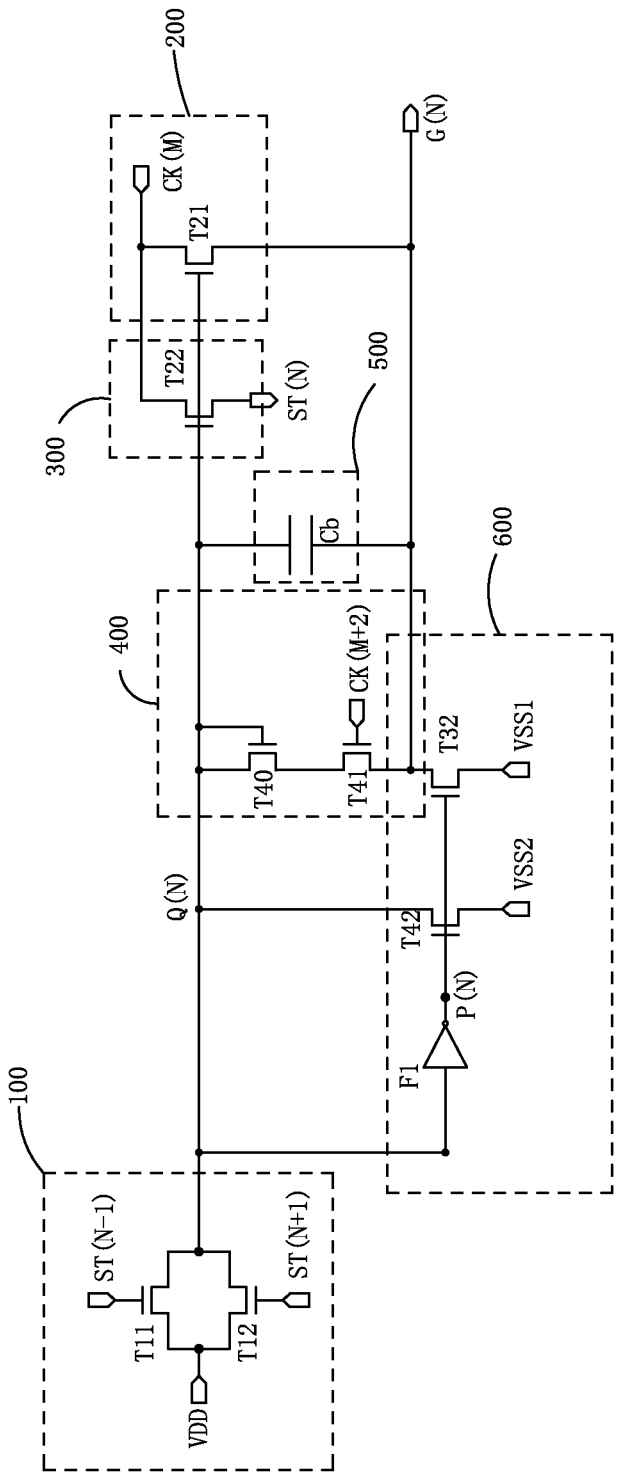
FIG. 4 is a circuit diagram of the second embodiment of a GOA circuit with forward-backward scan function according to the present invention.

Please refer to FIG. 4. FIG. 4 is the second embodiment of a GOA circuit with forward-backward scan function according to the present invention. The difference of the second embodiment from the first embodiment is that the first pull-down module 400 comprises: a forty-first thin film transistor T41, and a gate of the forty-first thin film transistor T41 is electrically coupled to a M+2th clock signal CK(M+2), and a source is electrically coupled to a drain of the fortieth thin film transistor T40, and a drain is electrically coupled to the scan drive signal G(N); a fortieth thin film transistor T40, and both a gate and a source of the fortieth thin film transistor T40 are electrically coupled to the first node Q(N), and a drain is electrically coupled to the source of the fortieth thin film transistor T41. With adding the additional fortieth thin film transistor T40 coupled in a diode connection, the crossfire current between the first negative constant voltage source VSS1 and the second negative constant voltage source VSS2 can be diminished to reduce the influence of the crossfire current to the constant voltage source. The reset is the same as the first embodiment. The repeated description is omitted here.

Figure 5:
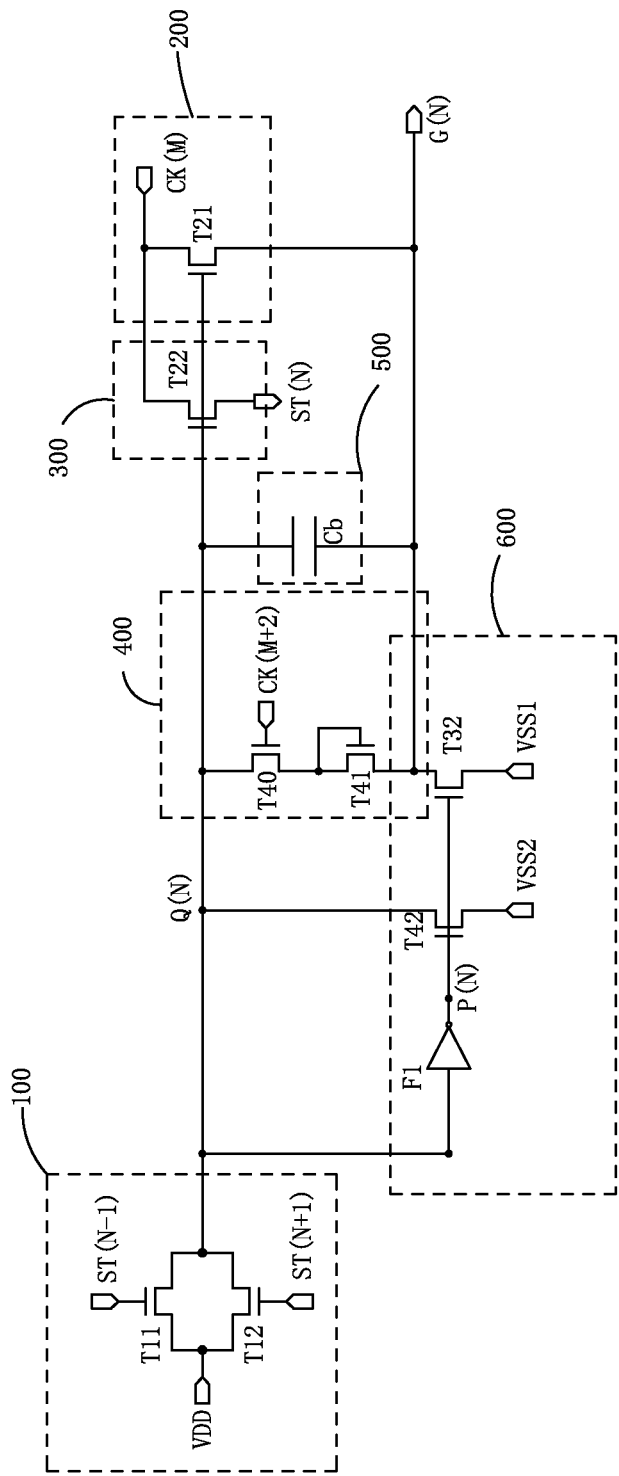
FIG. 5 is a circuit diagram of the third embodiment of a GOA circuit with forward-backward scan function according to the present invention.

Please refer to FIG. 5. FIG. 5 is the third embodiment of a GOA circuit with forward-backward scan function according to the present invention. The difference of the third embodiment from the first embodiment is that the first pull-down module 400 comprises: a fortieth thin film transistor T40, and a gate of the fortieth thin film transistor T40 is electrically coupled to a M+2th clock signal CK(M+2), and a source is electrically coupled to the first node Q(N), and a drain is electrically coupled to a gate and a source of the forty-first thin film transistor T41; a forty-first thin film transistor T41, and both the gate and the source of the forty-first thin film transistor T41 are electrically coupled to the drain of the fortieth thin film transistor T40, and a drain is electrically coupled to the scan drive signal G(N). The forty-first thin film transistor T41 is connected in a diode-connection and can reduce the influence of the crossfire current to the constant voltage source in the same way. The reset is the same as the first embodiment. The repeated description is omitted here.

Figure 6:
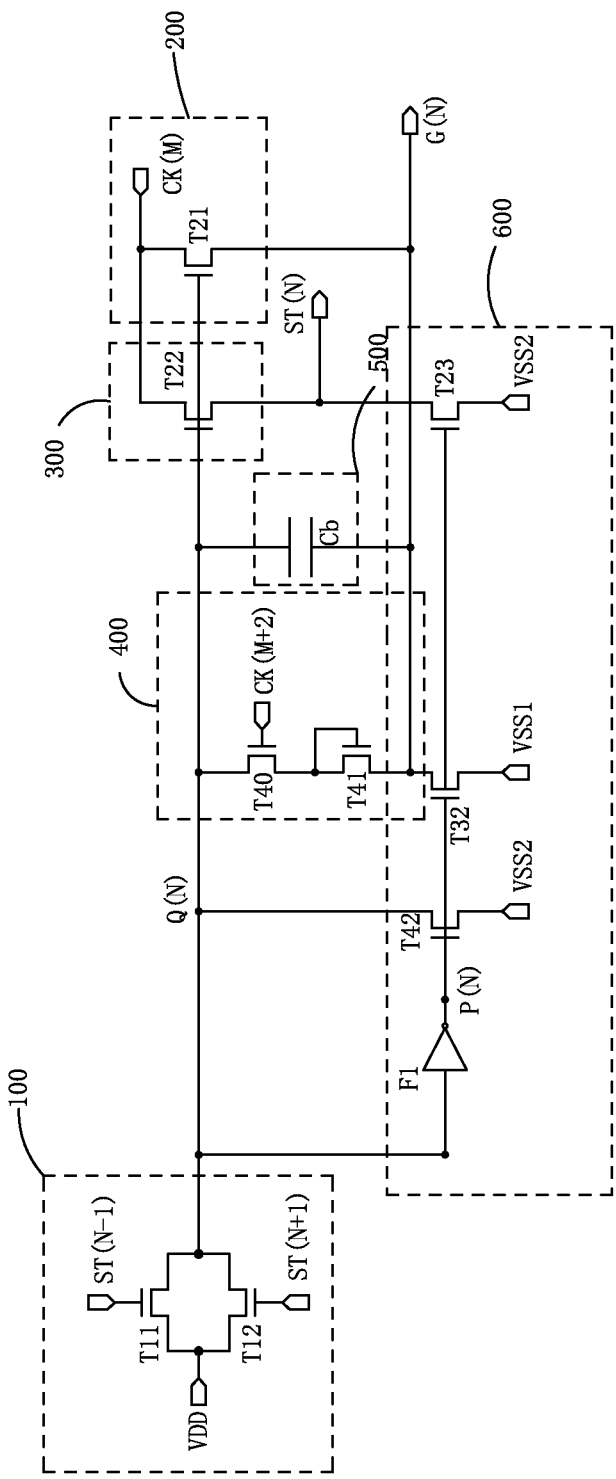
FIG. 6 is a circuit diagram of the fourth embodiment of a GOA circuit with forward-backward scan function according to the present invention.

Please refer to FIG. 6. FIG. 6 is the fourth embodiment of a GOA circuit with forward-backward scan function according to the present invention. The difference of the fourth embodiment from the third embodiment is that the pull-down holding module 600 comprises: a twenty-third thin film transistor T23, and a gate of the twenty-third thin film transistor T23 is electrically coupled to the second node P(N), and a source is electrically coupled to a second negative constant voltage source VSS2, and a drain is electrically coupled to the stage transfer signal ST(N), and the twenty-third thin film transistor T23 is employed to maintain the stage transfer signal ST(N) at low voltage level in the non-functioning period. The reset is the same as the third embodiment. The repeated description is omitted here.

Figure 7:
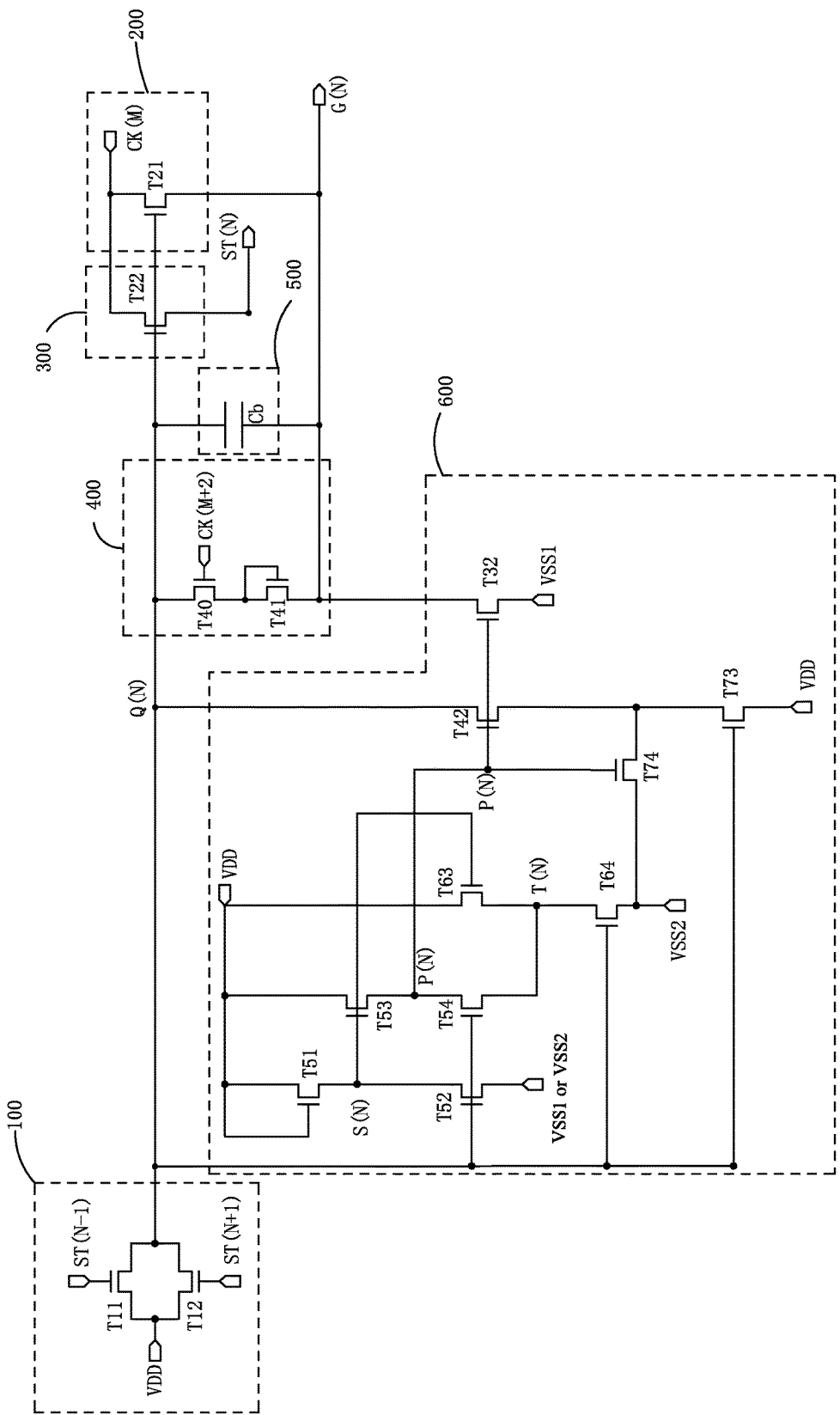
FIG. 7 is a circuit diagram of the fifth embodiment of a GOA circuit with forward-backward scan function according to the present invention.

Please refer to FIG. 7. FIG. 7 is the fifth embodiment of a GOA circuit with forward-backward scan function according to the present invention. The fifth embodiment shows one specific structure of the inverter F1, and the difference from the third embodiment is that the pull-down holding module 600 is added with a seventy-fourth thin film transistor T74 and a seventy-third thin film transistor T73. Namely, the pull-down holding module 600 comprises an inverter F1, a thirty-second thin film transistor T32, a forty-second thin film transistor T42, a seventy-fourth thin film transistor T74 and a seventy-third thin film transistor T73, and a source of the forty-second thin film transistor T42 is electrically coupled to a second negative constant voltage source VSS2 via the seventy-fourth thin film transistor T74.

A gate of the seventy-fourth thin film transistor T74 is electrically coupled to the second node P(N), and a source is coupled to a second negative constant voltage source VSS2, and a drain is electrically coupled to the source of the forty-second thin film transistor T42 and a source of the seventy-third thin film transistor T73; a seventy-third thin film transistor T73, and a gate of the seventy-third thin film transistor T73 is electrically coupled to the first node Q(N), and a source is electrically coupled to a drain of the seventy-fourth thin film transistor T74, and a drain is electrically coupled to the positive constant voltage source VDD;

the inverter F1 comprises: a fifty-first thin film transistor T51, and both a gate and a source of the fifty-first thin film transistor T51 are electrically coupled to the positive constant voltage source VDD, and a drain is electrically coupled to a third node S(N); a fifty-second thin film transistor T52, and a gate of the fifty-second thin film transistor T52 is electrically coupled to the first node Q(N), and a source is electrically coupled to the third node S(N), and a drain is electrically coupled to a first negative constant voltage source VSS1 or the second negative constant voltage source VSS2; a fifty-third thin film transistor T53, and a gate of the fifty-third thin film transistor T53 is electrically coupled to the third node S(N), and a source is electrically coupled to the positive constant voltage source VDD, and a drain is electrically coupled to the second node P(N); a fifty-fourth thin film transistor T54, and a gate of the fifty-fourth thin film transistor T54 is electrically coupled to the first node Q(N), and a source is electrically coupled to the second node P(N), and a drain is electrically coupled to a fourth node T(N); a sixty-third thin film transistor T63, and a gate of the sixty-third thin film transistor T63 is electrically coupled to the third node S(N), and a source is electrically coupled to the positive constant voltage source VDD, and a drain is electrically coupled to the fourth node T(N); a sixty-fourth thin film transistor T64, and a gate of the sixty-fourth thin film transistor T64 is electrically coupled to the first node Q(N), and a source is electrically coupled to the fourth node T(N), and a drain is electrically coupled to the second negative constant voltage source VSS2.

Particularly, the aforesaid inverter F1 is a dual inverter. The fifty-first thin film transistor T51, the fifty-second thin film transistor T52, the fifty-third thin film transistor T53 and the fifty-fourth thin film transistor T54 construct a main inverter, and the sixty-third thin film transistor T63 and the sixty-fourth thin film transistor T64 construct an auxiliary inverter.

As the first node Q(N) is high voltage level in the functioning period, the both the fifty-second thin film transistor T52 and the fifty-fourth thin film transistor T54 in the main inverter are on, and the fifty-first thin film transistor T51 and the fifty-third thin film transistor T53 are off. The sixty-fourth thin film transistor T64 in the auxiliary inverter is on, and the sixty-third thin film transistor T63 is off, and the voltage level of the second node P(N) is pulled down to the second negative constant voltage source VSS2 which lower than the first negative constant voltage source VSS1; as the first node Q(N) is low voltage level, both the fifty-second thin film transistor T52 and the fifty-fourth thin film transistor T54 in the main inverter are off, and both the fifty-first thin film transistor T51 and the fifty-third thin film transistor T53 are off, and the voltage level of the second node P(N) is the voltage level of the positive constant voltage source VDD. Accordingly, the auxiliary inverter of the inverter F1 can provide a lower voltage level to the main inverter in the functioning period to ensure that the first node Q(N) and the scan drive signal G(N) steadily output high voltage levels.

Figure 10:
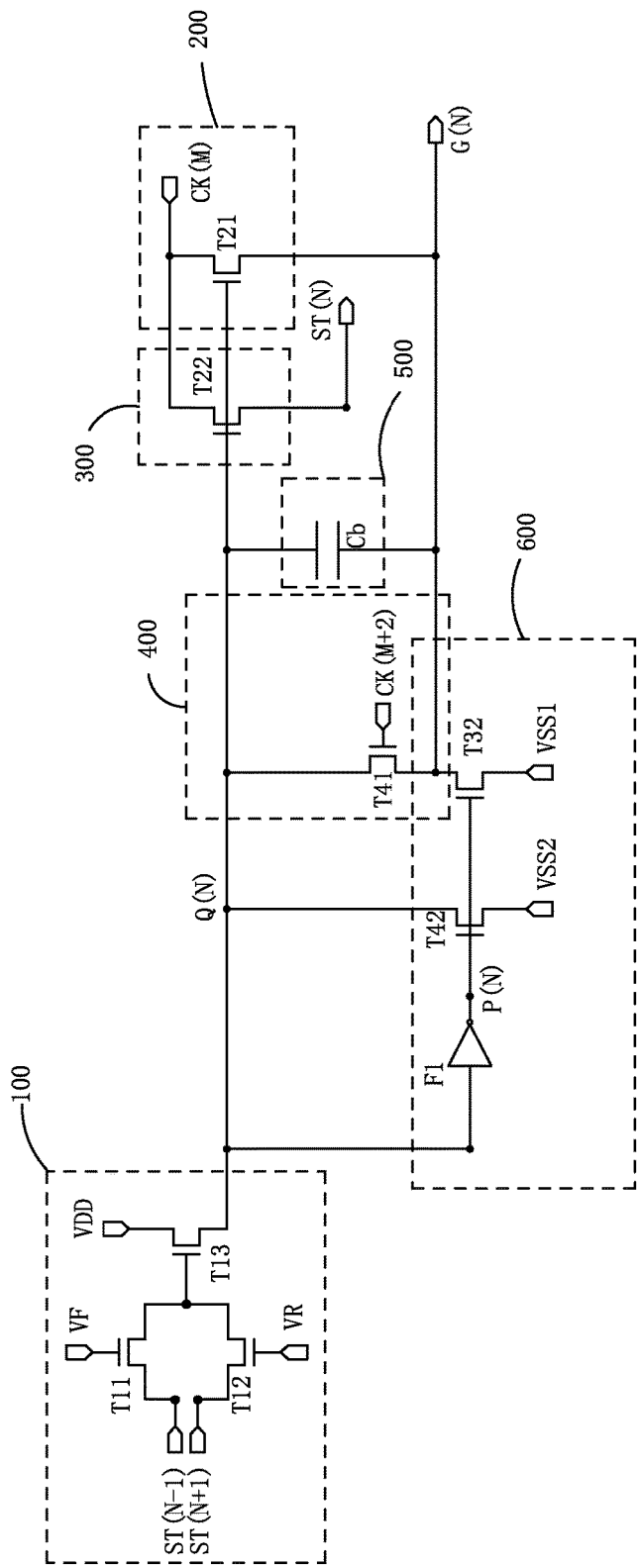
FIG. 10 is a circuit diagram of the sixth embodiment of a GOA circuit with forward-backward scan function according to the present invention.

Please refer to FIG. 10. FIG. 10 is the sixth embodiment of a GOA circuit with forward-backward scan function according to the present invention. The difference of the sixth embodiment from the first embodiment is that the settings of the pull-up controlling module 100 are different. The pull-up controlling module 100 in the sixth embodiment comprises: a eleventh thin film transistor T11, and a gate of the eleventh thin film transistor T11 receives a forward scan control voltage VF, and a source receives the stage transfer signal ST(N−1) of the GOA unit circuit of the former N−1th stage, and a drain is electrically coupled to a gate of the thirteenth thin film transistor T13; a twelfth thin film transistor T12, and a gate of the twelfth thin film transistor T12 receives a backward scan control voltage VR, and a source receives a stage transfer signal ST(N+1) of the GOA unit circuit of the latter N+1th stage, and a drain is electrically coupled to a gate of the thirteenth thin film transistor T13; the thirteenth thin film transistor T13, and the gate of the thirteenth thin film transistor T13 is electrically coupled to the drain of the eleventh thin film transistor T11, and a source receives the positive constant voltage source VDD, and a drain is electrically coupled to the first node Q(N); the eleventh thin film transistor T11 is combined with the forward scan control voltage VF to control the forward scan, and the twelfth thin film transistor T12 is combined with the backward scan control voltage VR to control the backward scan.

Figure 11:
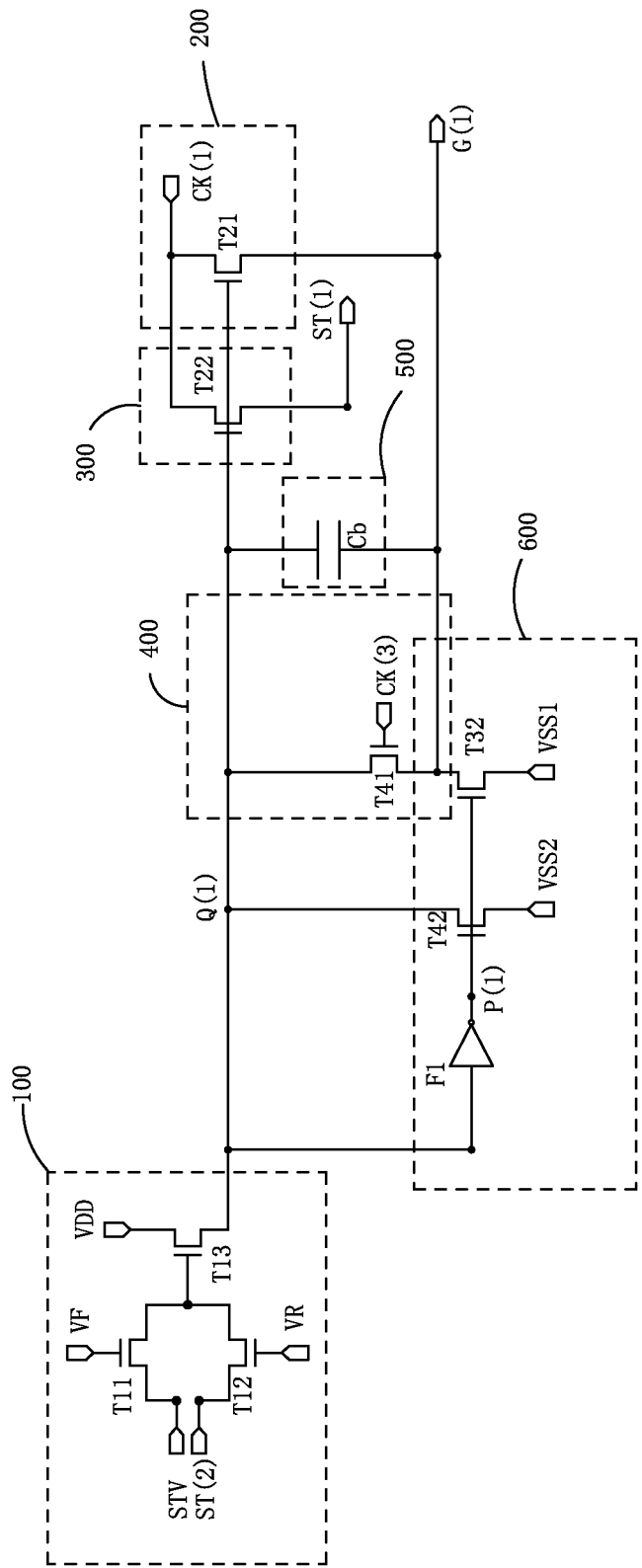
FIG. 11 is a circuit diagram of a GOA unit circuit of the first stage of the sixth embodiment according to the GOA circuit with forward-backward scan function of the present invention.

Particularly, as shown in FIG. 11, in the first stage of the GOA circuit with forward-backward scan function of the sixth embodiment of the present invention, the source of the eleventh thin film transistor T11 receives a scan activation signal STV, and the source of the twelfth thin film transistor T12 receives the stage transfer signal ST(2) of the GOA unit circuit of the second stage, and the source of the twenty-first thin film transistor T21 and the source of the twenty-second thin film transistor T22 are electrically coupled to the first clock signal CK(1).

Figure 12:
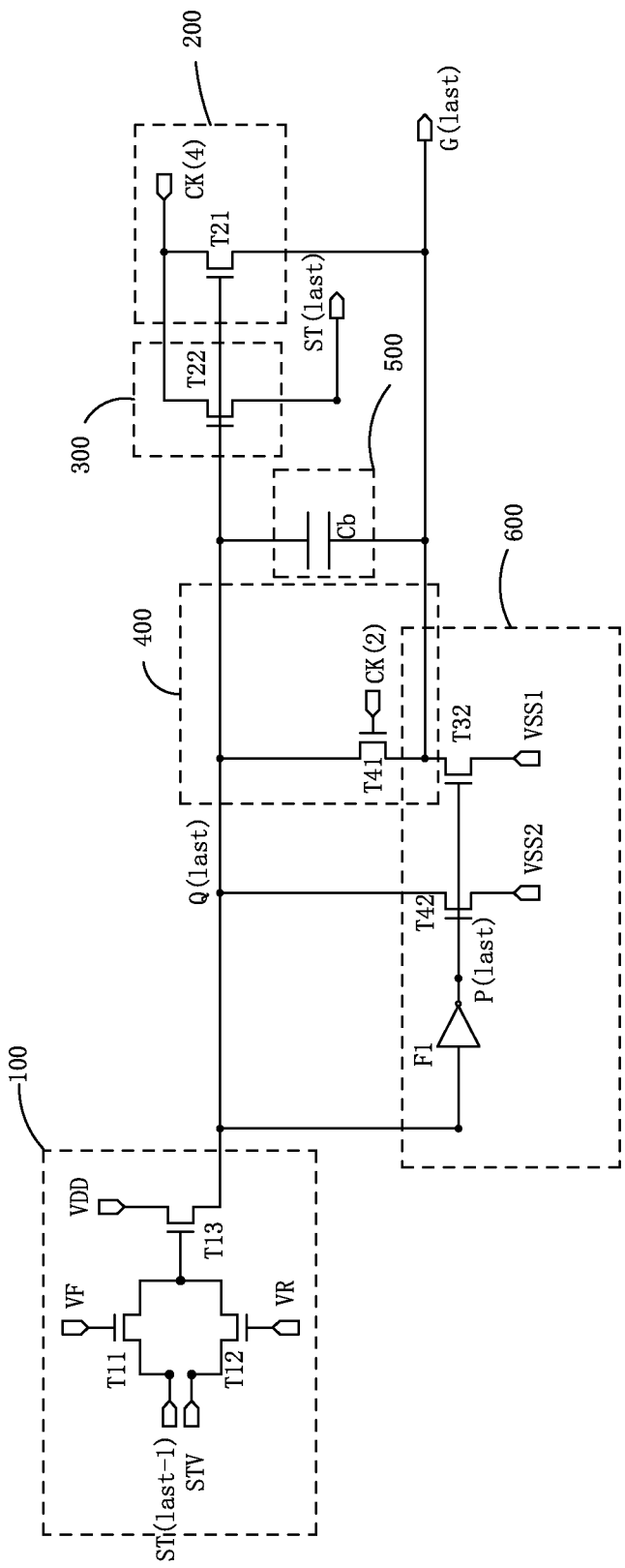
FIG. 12 is a circuit diagram of a GOA unit circuit of the last stage of the sixth embodiment according to the GOA circuit with forward-backward scan function of the present invention.
Figure 13:
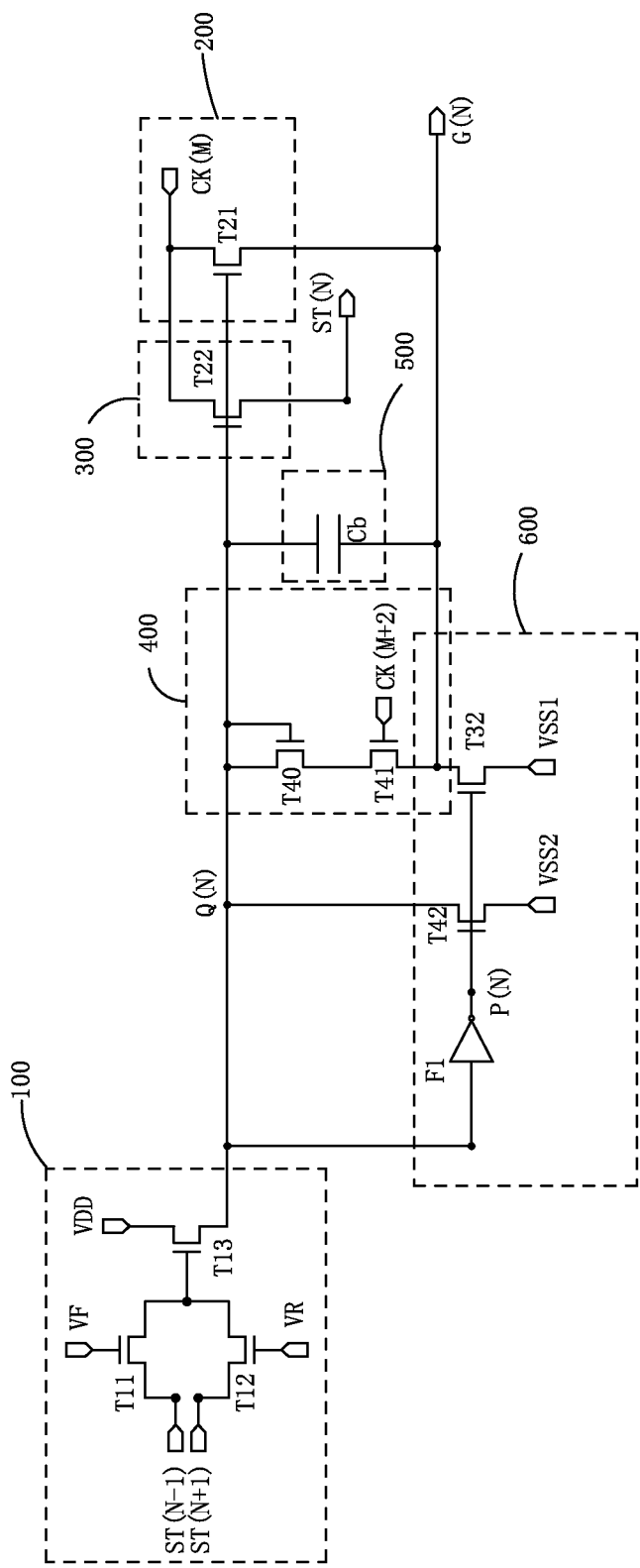
FIG. 13 is a circuit diagram of the seventh embodiment of a GOA circuit with forward-backward scan function according to the present invention.
Figure 14:
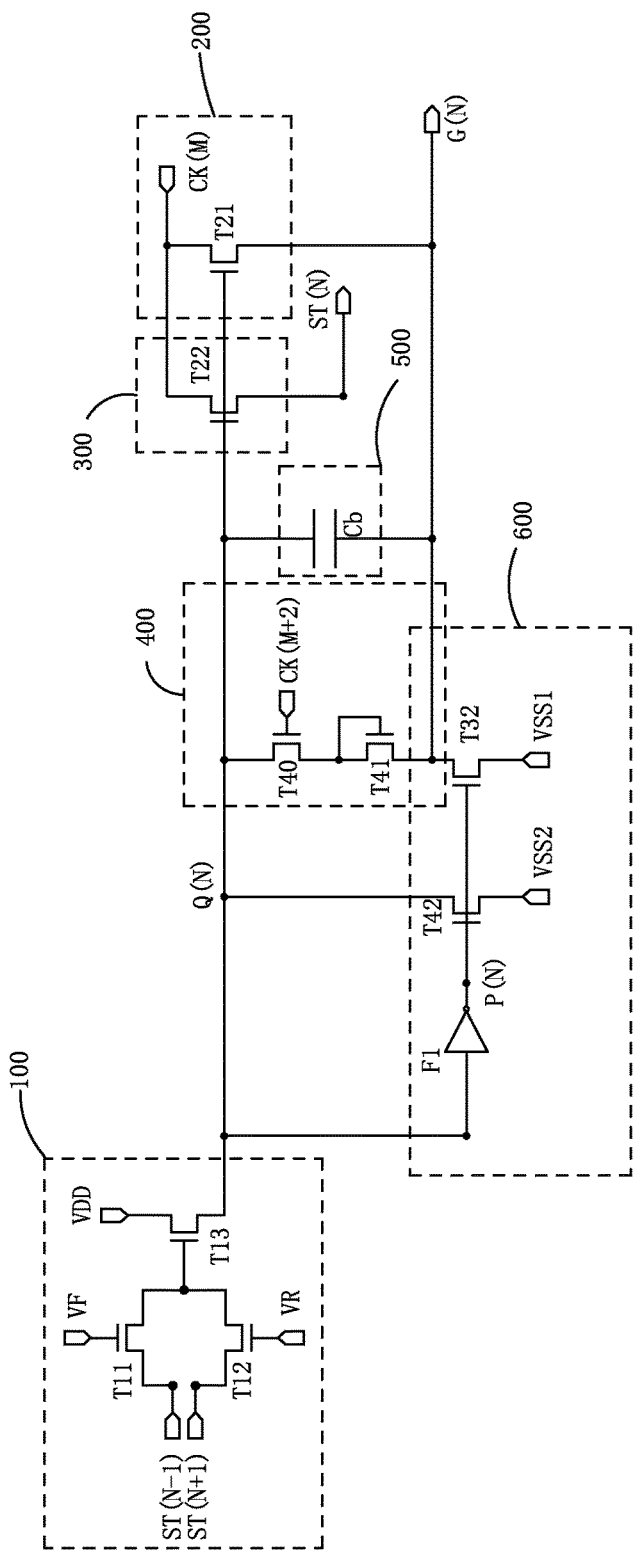
FIG. 14 is a circuit diagram of the eighth embodiment of a GOA circuit with forward-backward scan function according to the present invention.
Figure 15:
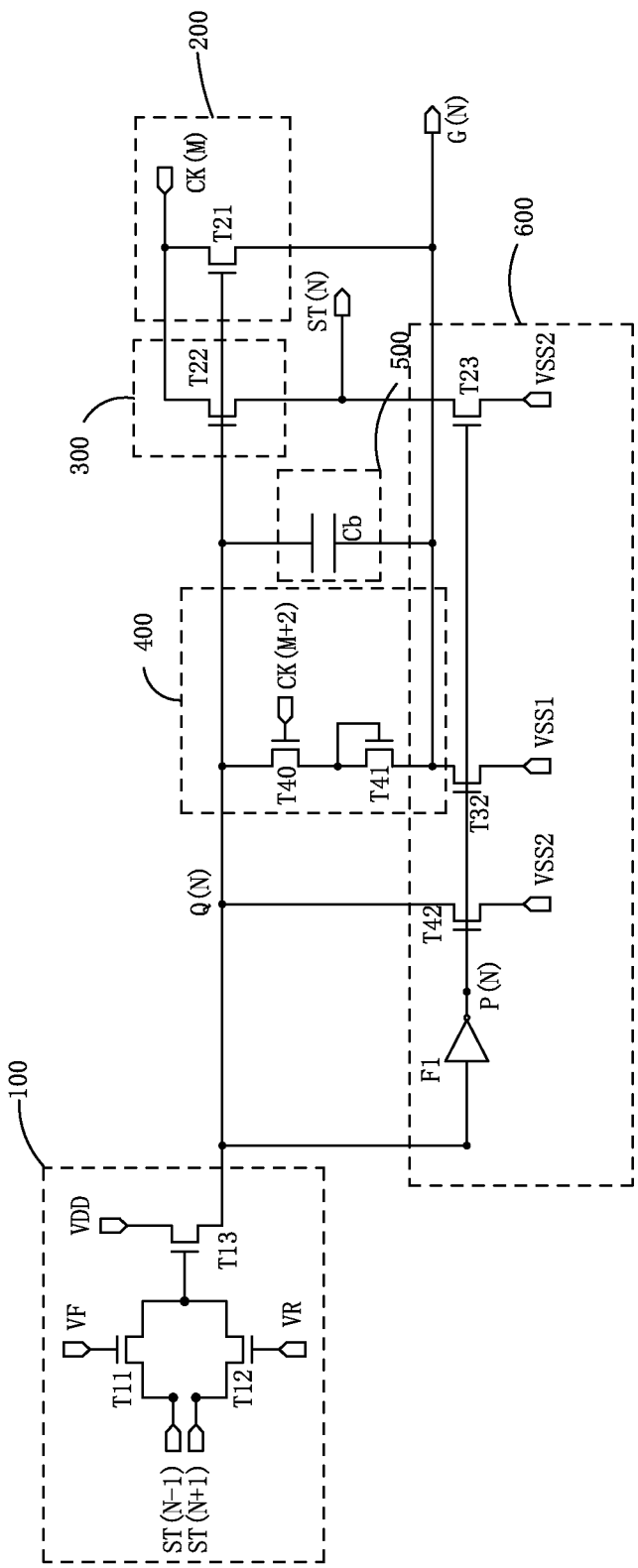
FIG. 15 is a circuit diagram of the ninth embodiment of a GOA circuit with forward-backward scan function according to the present invention.
Figure 16:
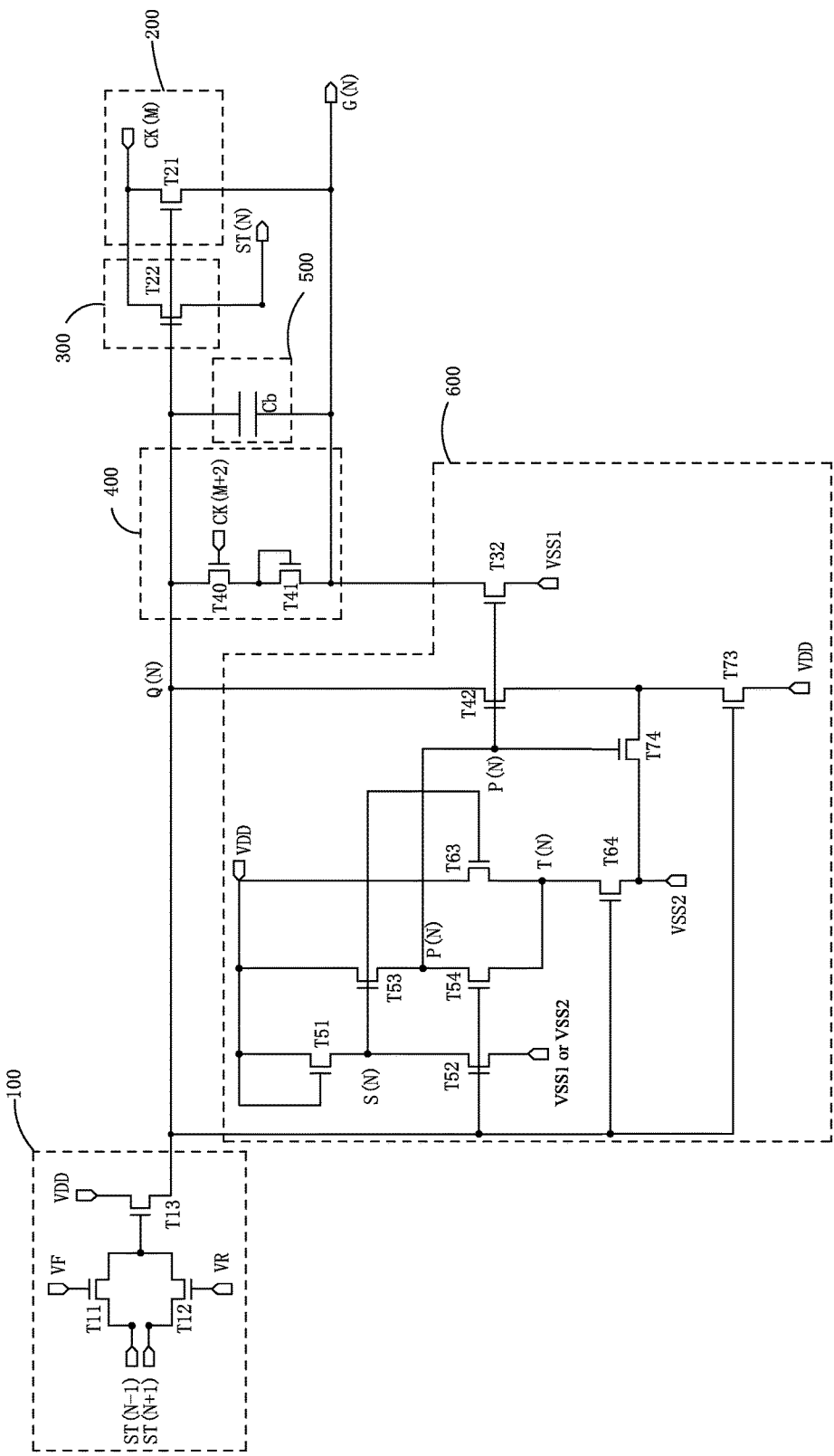
FIG. 16 is a circuit diagram of the tenth embodiment of a GOA circuit with forward-backward scan function according to the present invention.
Figure 17:
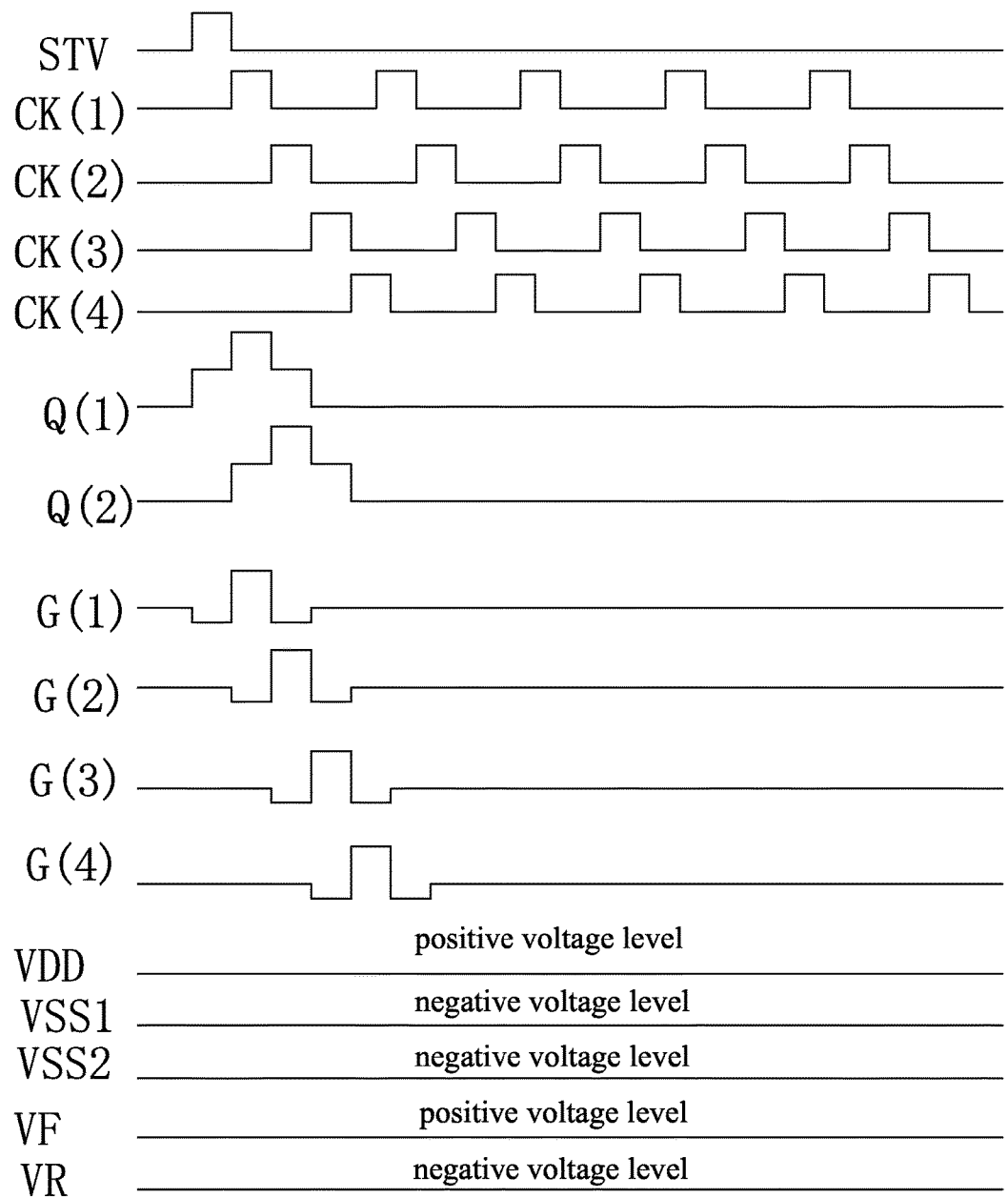
FIG. 17 is a forward scan sequence diagram of the sixth to tenth embodiments of the GOA circuit with forward-backward scan function according to the present invention.
Figure 18:
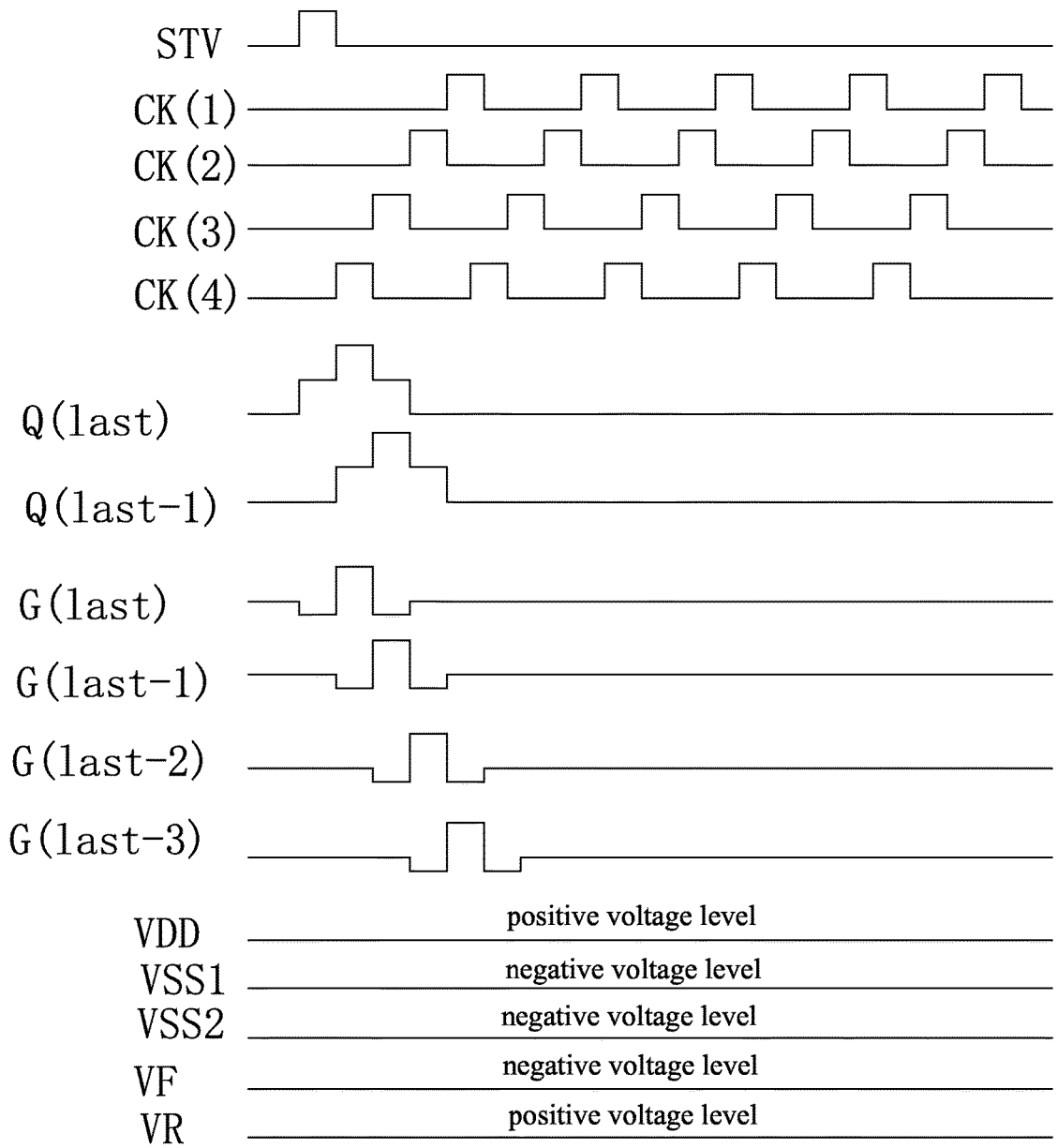
FIG. 18 is a backward scan sequence diagram of the sixth to tenth embodiments of the GOA circuit with forward-backward scan function according to the present invention.

As shown in FIG. 12, in the last stage connection of the GOA circuit with forward-backward scan function of the first embodiment of the present invention, the source of the eleventh thin film transistor T11 receives the stage transfer signal ST(last−1) of the GOA unit circuit of the next stage to the last stage, and the source of the twelfth thin film transistor T12 receives the scan activation signal STV, and the source of the twenty-first thin film transistor T21 and the source of the twenty-second thin film transistor T22 are electrically coupled to the fourth clock signal CK(4).

Combining FIG. 10, FIG. 11, FIG. 17 and FIG. 19, as the sixth embodiment performs forward scan, the forward scan voltage level signal VF is positive high voltage level, and the backward scan voltage level signal VR is negative low voltage level, and the eleventh thin film transistor T11 is controlled by the forward scan voltage level signal VF to be on, and transmits the stage transfer signal ST(N−1) of the former stage to the gate of the thirteenth thin film transistor T13. As the stage transfer signal ST(N−1) of the former stage is high voltage level, the thirteenth thin film transistor T13 is on, and the positive voltage of the positive constant voltage source VDD enters the GOA unit circuit of the present stage, and the twelfth thin film transistor T12 is controlled by the backward scan voltage level signal VR to be off. Thus, the forward scan is achieved.

Combining FIG. 10, FIG. 12, FIG. 18 and FIG. 19, as the sixth embodiment performs backward scan, the forward scan voltage level signal VF is negative low voltage level, and the backward scan voltage level signal VR is positive high voltage level, and the twelfth thin film transistor T12 is controlled by the backward scan voltage level signal VR to be on, and transmits the stage transfer signal ST(N+1) of the latter stage to the gate of the thirteenth thin film transistor T13. As the stage transfer signal ST(N+1) of the latter stage is high voltage level, the thirteenth thin film transistor T13 is on, and the positive voltage of the positive constant voltage source VDD enters the GOA unit circuit of the present stage, and the eleventh thin film transistor T11 is controlled by the forward scan voltage level signal VR to be off. Thus, the backward scan is achieved. The reset is the same as the first embodiment. The repeated description is omitted here.

Please refer to FIG. 13, FIG. 14, FIG. 15, FIG. 16, which are the seventh, eighth, ninth, tenth embodiments respectively replacing the pull-up controlling module 100 in the second, third, fourth, fifth embodiments with the pull-up controlling module 100 in the sixth embodiment. Except that, the reset is the same. The repeated description is omitted here.

Figure 20:
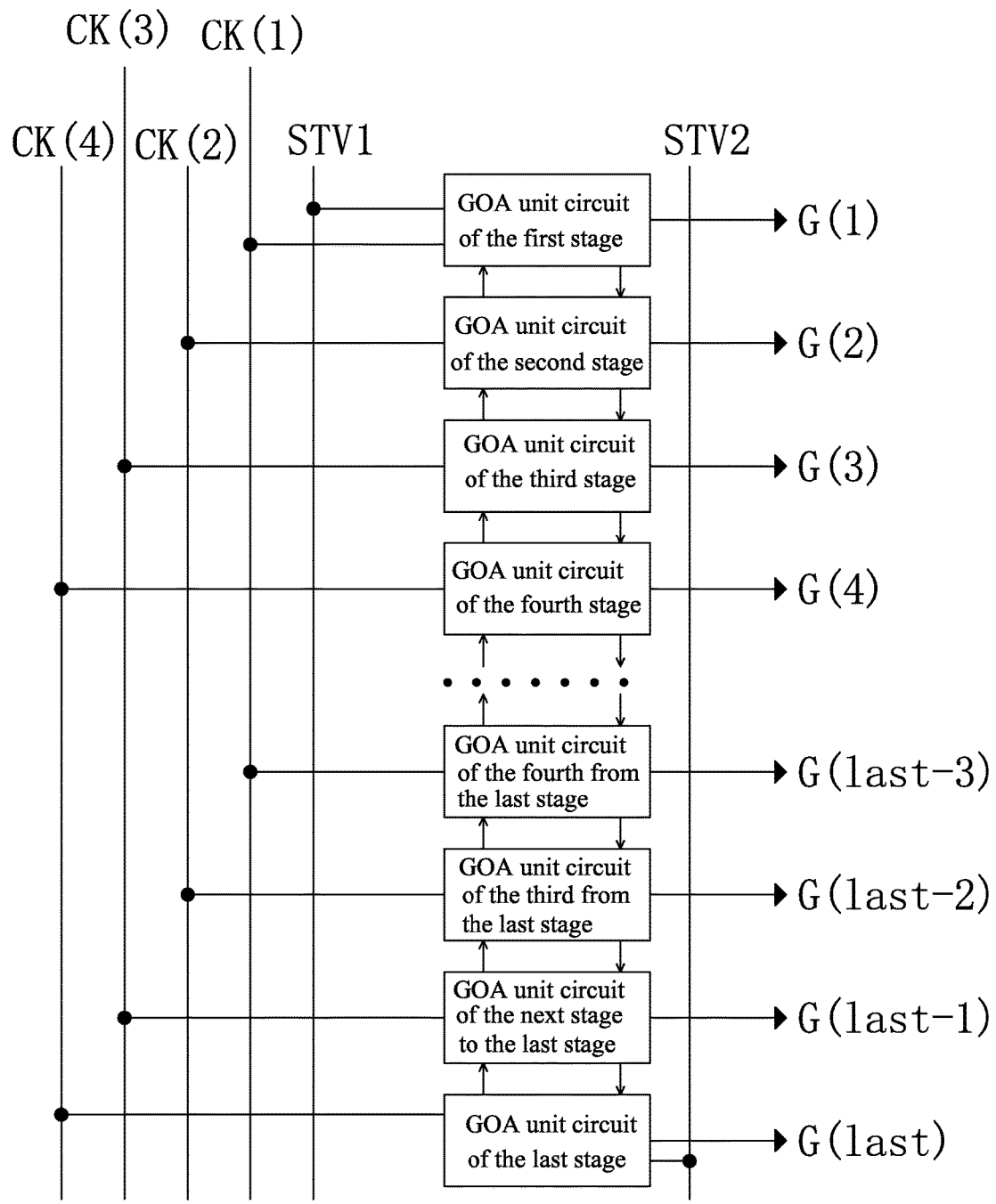
FIG. 20 is a second connection structure diagram of the GOA circuit with forward-backward scan function according to the present invention.

The GOA circuit connection structure shown in FIG. 20 is an optimization to FIG. 19. The scan drive signal STV is divided into forward, backward scan drive signals STV1, STV2. The forward scan drive signal STV1 is received by the GOA unit circuit of the first stage. The backward scan drive signal STV2 is received by the GOA unit circuit of the last stage. In forward scan, the forward scan drive signal STV1 is employed to realize the circuit activation, and in the backward scan, the backward scan drive signal STV2 is employed to realize the circuit activation. Accordingly, the mutual interference of the scan drive signals in forward-backward scan can be prevented.

In conclusion, the present invention provides a GOA circuit with forward-backward scan function. In the GOA unit circuit of every stage, the pull-up controlling module comprises two thin film transistors respectively controlling the forward, backward scans. With proper received signals, as the thin film transistor controlling the forward scan is on, the GOA circuit performs forward scan from the GOA unit circuit of the first stage to the GOA unit circuit of the last stage, and as the thin film transistor controlling the backward scan is on, the GOA circuit performs backward scan from the GOA unit circuit of the last stage to the GOA unit circuit of the first stage. Thurs, the GOA circuit possessing functions of forward scan and backward scan at the same time can be achieved to expand the application field of the GOA circuit.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A GOA circuit with forward-backward scan function, comprising a plurality of GOA unit circuits which are cascade connected, and the GOA unit circuit of every stage comprises a pull-up controlling module, a pull-up module, a transmission module, a first pull-down module, a bootstrap capacitor module and a pull-down holding module;

N is set to be a positive integer and except the GOA unit circuit of the first and last stages, in the GOA unit circuit of the Nth stage:

the pull-up controlling module is employed to control the GOA circuit to perform forward scan or backward scan, and is electrically coupled to a first node and the pull-down holding module; the pull-up controlling module at least comprises a thin film transistor for controlling the forward scan and a film transistor for controlling the backward scan, and a stage transfer at least coupled to a GOA unit circuit of the former N−1th stage, a stage transfer at least coupled to a GOA unit circuit of the latter N+1th stage and a positive constant voltage source;

the pull-up module comprises: a twenty-first thin film transistor, and a gate of the twenty-first thin film transistor is electrically coupled to the first node, and a source is electrically coupled to a Mth clock signal, and a drain is electrically coupled to a scan driving signal;

the transmission module comprises: a twenty-second thin film transistor, and a gate of the twenty-second thin film transistor is electrically coupled to the first node, and a source is electrically coupled to the Mth clock signal, and a drain is electrically coupled to the stage transfer signal;

the first pull-down module is electrically coupled to the first node and a scan drive signal, and at least comprises one thin film transistor controlled by a M+2 clock signal;

the bootstrap capacitor module comprises a capacitor, and one end of the capacitor is electrically coupled to the first node, and the other end is electrically coupled to the scan drive signal;

the pull-down holding module at least comprises: an inverter constructed by a plurality of thin film transistors, and an input end of the inverter is electrically coupled to the first node, and an output end is electrically coupled to a second node; a forty-second thin film transistor, and a gate of the forty-second thin film transistor is electrically coupled to the second node, and a source is electrically coupled to the first node, and a drain is electrically coupled to a second negative constant voltage source; a thirty-second thin film transistor, and a gate of the thirty-second thin film transistor is electrically coupled to the second node, and a source is electrically coupled to the scan drive signal, and a drain is electrically coupled to a first negative constant voltage source;

the clock signal comprise four clock signals: a first clock signal, a second clock signal, a third clock signal and a fourth clock signal; as the clock signal is the third clock signal, the M+2th clock signal is the first clock signal, and as the clock signal is the fourth clock signal, the M+2th clock signal is the second clock signal; a duty ratio of the clock signal is 25/75;

a voltage level of the second negative constant voltage source is smaller than a voltage level of the first negative constant voltage source.

2. The GOA circuit with forward-backward scan function according to claim 1, wherein the pull-up controlling module comprises two thin film transistors: an eleventh thin film transistor and a twelfth thin film transistor;

a gate of the eleventh thin film transistor receives the stage transfer signal of the GOA unit circuit of the former N−1th stage, and a source receives the positive constant voltage source, and a drain is electrically coupled to the first node; a gate of the twelfth thin film transistor receives a stage transfer signal of the GOA unit circuit of the latter N+1th stage, and a source receives the positive constant voltage source, and a drain is electrically coupled to the first node; the eleventh thin film transistor is employed to control the forward scan, and the twelfth thin film transistor is employed to control the backward scan.

3. The GOA circuit with forward-backward scan function according to claim 2, wherein in the first stage connection of the GOA circuit with forward-backward scan function, the gate of the eleventh thin film transistor receives a scan activation signal, and the gate of the twelfth thin film transistor receives the stage transfer signal of the GOA unit circuit of the second stage, and the source of the twenty-first thin film transistor and the source of the twenty-second thin film transistor are electrically coupled to the first clock signal;

in the last stage connection of the GOA circuit with forward-backward scan function, the gate of the eleventh thin film transistor receives the stage transfer signal of the GOA unit circuit of the next stage to the last stage, and the gate of the twelfth thin film transistor receives the scan activation signal, and the source of the twenty-first thin film transistor and the source of the twenty-second thin film transistor are electrically coupled to the fourth clock signal.

4. The GOA circuit with forward-backward scan function according to claim 1, wherein the pull-up controlling module comprises an eleventh thin film transistor, a twelfth thin film transistor and a thirteenth thin film transistor;

a gate of the eleventh thin film transistor receives a forward scan control voltage, and a source receives the stage transfer signal of the GOA unit circuit of the former N−1th stage, and a drain is electrically coupled to a gate of the thirteenth thin film transistor; a gate of the twelfth thin film transistor receives a backward scan control voltage, and a source receives a stage transfer signal of the GOA unit circuit of the latter N+1th stage, and a drain is electrically coupled to a gate of the thirteenth thin film transistor; the gate of the thirteenth thin film transistor is electrically coupled to the drain of the eleventh thin film transistor and the drain of the twelfth thin film transistor, and a source receives the positive constant voltage source, and a drain is electrically coupled to the first node; the eleventh thin film transistor is combined with the forward scan control voltage to control the forward scan, and the twelfth thin film transistor is combined with the backward scan control voltage to control the backward scan;

in forward scan, the forward scan voltage level signal is positive high voltage level, and the backward scan voltage level signal is negative low voltage level;

in backward scan, the forward scan voltage level signal is negative low voltage level, and the backward scan voltage level signal is positive high voltage level.

5. The GOA circuit with forward-backward scan function according to claim 4, wherein in the first stage connection of the GOA circuit with forward-backward scan function, the source of the eleventh thin film transistor receives a scan activation signal, and the source of the twelfth thin film transistor receives the stage transfer signal of the GOA unit circuit of the second stage, and the source of the twenty-first thin film transistor and the source of the twenty-second thin film transistor are electrically coupled to the first clock signal;

in the last stage connection of the GOA circuit with forward-backward scan function, the source of the eleventh thin film transistor receives the stage transfer signal of the GOA unit circuit of the next stage to the last stage, and the source of the twelfth thin film transistor receives the scan activation signal, and the source of the twenty-first thin film transistor and the source of the twenty-second thin film transistor are electrically coupled to the fourth clock signal.

6. The GOA circuit with forward-backward scan function according to claim 1, wherein the first pull-down module comprises a thin film transistor: a forty-first thin film transistor, and a gate of the forty-first thin film transistor is electrically coupled to a M+2th clock signal, and a source is electrically coupled to the first node, and a drain is electrically coupled to the scan drive signal.

7. The GOA circuit with forward-backward scan function according to claim 1, wherein the first pull-down module comprises two thin film transistors: a forty-first thin film transistor and a fortieth thin film transistor;

a gate of the forty-first thin film transistor is electrically coupled to a M+2th clock signal, and a source is electrically coupled to a drain of the fortieth thin film transistor, and a drain is electrically coupled to the scan drive signal; both a gate and a source of the fortieth thin film transistor are electrically coupled to the first node, and a drain is electrically coupled to the source of the fortieth thin film transistor.

8. The GOA circuit with forward-backward scan function according to claim 1, wherein the first pull-down module comprises two thin film transistors: a forty-first thin film transistor and a fortieth thin film transistor;

a gate of the fortieth thin film transistor is electrically coupled to a M+2th clock signal, and a source is electrically coupled to the first node, and a drain is electrically coupled to a gate and a source of the forty-first thin film transistor; both the gate and the source of the forty-first thin film transistor are electrically coupled to the drain of the fortieth thin film transistor, and a drain is electrically coupled to the scan drive signal.

9. The GOA circuit with forward-backward scan function according to claim 1, wherein the pull-down holding module further comprises: a twenty-third thin film transistor, and a gate of the twenty-third thin film transistor is electrically coupled to the second node, and a source is electrically coupled to a second negative constant voltage source, and a drain is electrically coupled to the stage transfer signal.

10. The GOA circuit with forward-backward scan function according to claim 1, wherein the pull-down holding module comprises an inverter, a thirty-second thin film transistor, a forty-second thin film transistor, a seventy-fourth thin film transistor and a seventy-third thin film transistor; a source of the forty-second thin film transistor is electrically coupled to a second negative constant voltage source via the seventy-fourth thin film transistor;

a gate of the seventy-fourth thin film transistor is electrically coupled to the second node, and a source is coupled to a second negative constant voltage source, and a drain is electrically coupled to the source of the forty-second thin film transistor and a source of the seventy-third thin film transistor; a gate of the seventy-third thin film transistor is electrically coupled to the first node, and a source is electrically coupled to a drain of the seventy-fourth thin film transistor, and a drain is electrically coupled to the positive constant voltage source;

the inverter is a dual inverter, comprising: a fifty-first thin film transistor, and both a gate and a source of the fifty-first thin film transistor are electrically coupled to the positive constant voltage source, and a drain is electrically coupled to a third node; a fifty-second thin film transistor, and a gate of the fifty-second thin film transistor is electrically coupled to the first node, and a source is electrically coupled to the third node, and a drain is electrically coupled to a first negative constant voltage source or the second negative constant voltage source; a fifty-third thin film transistor, and a gate of the fifty-third thin film transistor is electrically coupled to the third node, and a source is electrically coupled to the positive constant voltage source, and a drain is electrically coupled to the second node; a fifty-fourth thin film transistor, and a gate of the fifty-fourth thin film transistor is electrically coupled to the first node, and a source is electrically coupled to the second node, and a drain is electrically coupled to a fourth node; a sixty-third thin film transistor, and a gate of the sixty-third thin film transistor is electrically coupled to the third node, and a source is electrically coupled to the positive constant voltage source, and a drain is electrically coupled to the fourth node; a sixty-fourth thin film transistor, and a gate of the sixty-fourth thin film transistor is electrically coupled to the first node, and a source is electrically coupled to the fourth node, and a drain is electrically coupled to the second negative constant voltage source; wherein the fifty-first thin film transistor, the fifty-second thin film transistor, the fifty-third thin film transistor and the fifty-fourth thin film transistor construct a main inverter, and the sixty-third thin film transistor and the sixty-fourth thin film transistor construct an auxiliary inverter.

11. A GOA circuit with forward-backward scan function, comprising a plurality of GOA unit circuits which are cascade connected, and the GOA unit circuit of every stage comprises a pull-up controlling module, a pull-up module, a transmission module, a first pull-down module, a bootstrap capacitor module and a pull-down holding module;

N is set to be a positive integer and except the GOA unit circuit of the first and last stages, in the GOA unit circuit of the Nth stage:

the pull-up controlling module is employed to control the GOA circuit to perform forward scan or backward scan, and is electrically coupled to a first node and the pull-down holding module; the pull-up controlling module at least comprises a thin film transistor for controlling the forward scan and a film transistor for controlling the backward scan, and a stage transfer at least coupled to a GOA unit circuit of the former N−1th stage, a stage transfer at least coupled to a GOA unit circuit of the latter N+1th stage and a positive constant voltage source;

the pull-up module comprises: a twenty-first thin film transistor, and a gate of the twenty-first thin film transistor is electrically coupled to the first node, and a source is electrically coupled to a Mth clock signal, and a drain is electrically coupled to a scan driving signal;

the transmission module comprises: a twenty-second thin film transistor, and a gate of the twenty-second thin film transistor is electrically coupled to the first node, and a source is electrically coupled to the Mth clock signal, and a drain is electrically coupled to the stage transfer signal;

the first pull-down module is electrically coupled to the first node and a scan drive signal, and at least comprises one thin film transistor controlled by a M+2 clock signal;

the bootstrap capacitor module comprises a capacitor, and one end of the capacitor is electrically coupled to the first node, and the other end is electrically coupled to the scan drive signal;

the pull-down holding module at least comprises: an inverter constructed by a plurality of thin film transistors, and an input end of the inverter is electrically coupled to the first node, and an output end is electrically coupled to a second node; a forty-second thin film transistor, and a gate of the forty-second thin film transistor is electrically coupled to the second node, and a source is electrically coupled to the first node, and a drain is electrically coupled to a second negative constant voltage source; a thirty-second thin film transistor, and a gate of the thirty-second thin film transistor is electrically coupled to the second node, and a source is electrically coupled to the scan drive signal, and a drain is electrically coupled to a first negative constant voltage source;

the clock signal comprise four clock signals: a first clock signal, a second clock signal, a third clock signal and a fourth clock signal; as the clock signal is the third clock signal, the M+2th clock signal is the first clock signal, and as the clock signal is the fourth clock signal, the M+2th clock signal is the second clock signal; a duty ratio of the clock signal is 25/75;

a voltage level of the second negative constant voltage source is smaller than a voltage level of the first negative constant voltage source;

wherein the pull-up controlling module comprises two thin film transistors: an eleventh thin film transistor and a twelfth thin film transistor;

a gate of the eleventh thin film transistor receives the stage transfer signal of the GOA unit circuit of the former N−1th stage, and a source receives the positive constant voltage source, and a drain is electrically coupled to the first node; a gate of the twelfth thin film transistor receives a stage transfer signal of the GOA unit circuit of the latter N+1th stage, and a source receives the positive constant voltage source, and a drain is electrically coupled to the first node; the eleventh thin film transistor is employed to control the forward scan, and the twelfth thin film transistor is employed to control the backward scan;

wherein the first pull-down module comprises two thin film transistors: a forty-first thin film transistor and a fortieth thin film transistor;

a gate of the fortieth thin film transistor is electrically coupled to a M+2th clock signal, and a source is electrically coupled to the first node, and a drain is electrically coupled to a gate and a source of the forty-first thin film transistor; both the gate and the source of the forty-first thin film transistor are electrically coupled to the drain of the fortieth thin film transistor, and a drain is electrically coupled to the scan drive signal;

wherein the pull-down holding module further comprises: a twenty-third thin film transistor, and a gate of the twenty-third thin film transistor is electrically coupled to the second node, and a source is electrically coupled to a second negative constant voltage source, and a drain is electrically coupled to the stage transfer signal.

12. The GOA circuit with forward-backward scan function according to claim 11, wherein in the first stage connection of the GOA circuit with forward-backward scan function, the gate of the eleventh thin film transistor receives a scan activation signal, and the gate of the twelfth thin film transistor receives the stage transfer signal of the GOA unit circuit of the second stage, and the source of the twenty-first thin film transistor and the source of the twenty-second thin film transistor are electrically coupled to the first clock signal;

in the last stage connection of the GOA circuit with forward-backward scan function, the gate of the eleventh thin film transistor receives the stage transfer signal of the GOA unit circuit of the next stage to the last stage, and the gate of the twelfth thin film transistor receives the scan activation signal, and the source of the twenty-first thin film transistor and the source of the twenty-second thin film transistor are electrically coupled to the fourth clock signal.

* * * * *